(12) United States Patent
Xi et al.

(10) Patent No.: US 10,678,349 B2
(45) Date of Patent: Jun. 9, 2020

(54) HANDWRITING INPUT DEVICE

(71) Applicant: GUANGDONG ZONGHUA TOUCH CONTROL TECHNOLOGY CO., LTD., Dongguan, Guangdong (CN)

(72) Inventors: Bangzi Xi, Shenzhen (CN); Dezhong Zhu, Shenzhen (CN)

(73) Assignee: GUANGDONG ZONGHUA TOUCH CONTROL TECHNOLOGY CO., LTD., Dongguan (CN)

(*) Notice: Subject to any disclaimer, the term of this patent is extended or adjusted under 35 U.S.C. 154(b) by 3 days.

(21) Appl. No.: 16/062,380

(22) PCT Filed: Jul. 17, 2017

(86) PCT No.: PCT/CN2017/093076
§ 371 (c)(1),
(2) Date: Jun. 14, 2018

(87) PCT Pub. No.: WO2018/145403
PCT Pub. Date: Aug. 16, 2018

(65) Prior Publication Data
US 2019/0056808 A1 Feb. 21, 2019

(30) Foreign Application Priority Data
Feb. 13, 2017 (CN) .......................... 2017 1 0076117

(51) Int. Cl.
*G06F 3/0354* (2013.01)
*G06F 3/046* (2006.01)

(52) U.S. Cl.
CPC .......... *G06F 3/03545* (2013.01); *G06F 3/046* (2013.01)

(58) Field of Classification Search
CPC combination set(s) only.
See application file for complete search history.

(56) References Cited

U.S. PATENT DOCUMENTS

2016/0026302 A1* 1/2016 Li .......................... G06F 3/044
345/174

FOREIGN PATENT DOCUMENTS

| CN | 101673149 A | 3/2010 |
| CN | 201503583 U | 6/2010 |

(Continued)

OTHER PUBLICATIONS

Nov. 16, 2017 International Search Report issued in International Patent Application No. PCT/CN2017/093076.

(Continued)

*Primary Examiner* — Robin J Mishler

(57) ABSTRACT

A handwriting input device, including a display component, a magnetic signal sensing component arranged at a random position on the display component, and a magnetic signal output component arranged corresponding to the sensing component, wherein the display component, the sensing component and the output component are all arranged in a shell, and the shell is further includes a mainboard, wherein the sensing component includes a sensing element and a detection control circuit connected with the sensing element; the sensing element includes a horizontal and a vertical encoding array; and both the horizontal and the vertical encoding arrays consist of magnetic signal sensing coil units. The handwriting input device aims at solving the problems of long detection time, slow reaction speed, low positioning sensing precision, big long-distance movement accumulative error and complicated device of the magnetic sensing devices in the prior art.

11 Claims, 11 Drawing Sheets

(56) References Cited

FOREIGN PATENT DOCUMENTS

| CN | 102033681 A | 4/2011 |
|----|-------------|--------|
| CN | 101673149 B | 11/2011 |
| CN | 203606822 U | 5/2014 |
| CN | 106933437 A | 7/2017 |

OTHER PUBLICATIONS

Nov. 16, 2017 Written Opinion issued in International Patent Application No. PCT/CN2017/093076.

* cited by examiner

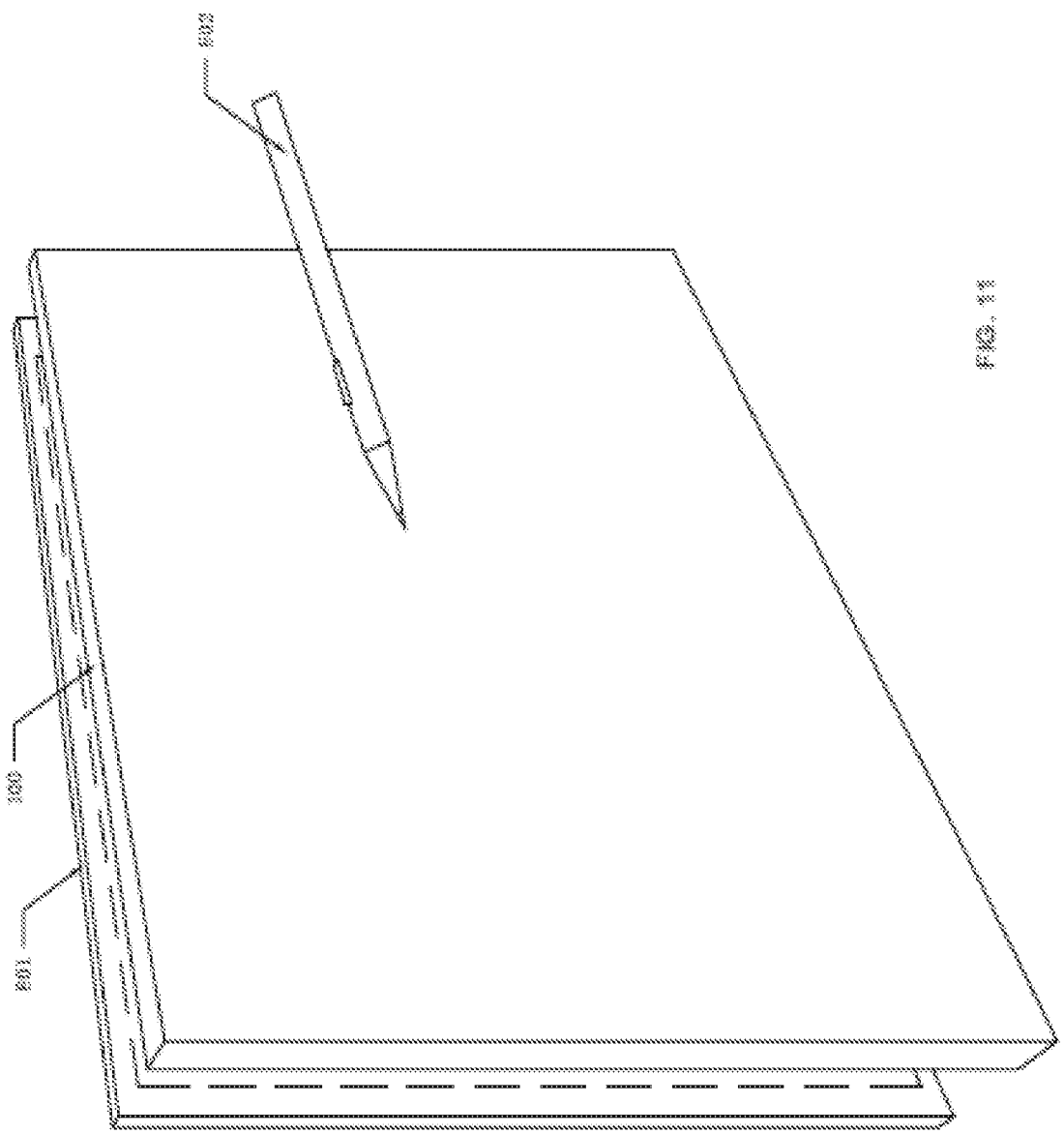

HANDWRITING INPUT DEVICE

TECHNICAL FIELD

The present invention relates to the field of magnetic sensing, and in particular to a handwriting input device.

BACKGROUND ART

Along with the improvement and development of electronic products and various numerically-controlled machine tools, the applications and requirements of sensors on sensing distances and positions of two-dimensional surfaces become more and more widespread.

For the existing handwriting input device, numerous geographical electromagnetic sensing coils from two-dimensional directions are generally adopted to scan and detect an electromagnetic pen.

The patent entitled "Single-layer Wiring System of Electromagnetic Antenna" with the patent number of CN201320756682.X discloses that numerous independent electromagnetic sensing channel coils are arranged at two directions on the two-dimensional surface to constitute a magnetic signal positioning sensor, the magnetic signal positioning sensor can be used for scanning, detecting and positioning the electromagnetic pen to realize a handwriting input touch device, and an independent electromagnetic sensing channel coil is arranged for this magnetic signal positioning sensor at each channel position.

When the independent electromagnetic sensing channel coils in the magnetic signal positioning sensor are accumulated to a certain extent, then it requires a long time to scan and detect such a magnetic signal positioning sensor in a regional manner, the reaction speed is slow, the positioning sensing precision is low, the long-distance movement accumulative error is big, and such magnetic signal positioning sensors are very complicated.

SUMMARY OF THE INVENTION

The present invention aims at solving one of the technical problems in the related art at least to some extent. To this end, a major object of the present invention is to provide a handwriting input device, aiming at solving the problems of long detection time, slow reaction speed, low positioning sensing precision, big long-distance movement accumulative error and complicated device of the magnetic sensing devices in the prior art.

To realize the above object, the present invention provides a handwriting input device, including a display component, a magnetic signal sensing component arranged at a random position within a range of 100 mm away from the display component in front or rear of the display component, and a magnetic signal output component arranged corresponding to the magnetic signal sensing component, wherein the display component, the magnetic signal sensing component and the magnetic signal output component are all arranged in a shell, and the shell is further provided with a mainboard;

wherein the magnetic signal sensing component includes a sensing element and a detection control circuit which is connected with the sensing element, the sensing element includes a horizontal encoding array and a vertical encoding array which is vertical to the horizontal encoding array, and both the horizontal encoding array and the vertical encoding array consist of magnetic signal sensing coil units.

The horizontal encoding array is composed of more than one magnetic signal sensing coil unit; the vertical encoding array is composed of more than one magnetic signal sensing coil unit; the magnetic signal sensing coil unit is formed by at least two magnetic sensing coils which are connected in series via a differential line; and the magnetic sensing coil is constituted by continuous loop wires of 1 circle to 10 circles.

The differential line which connects the magnetic sensing coils in series in the magnetic signal sensing coil unit is positioned within a magnetic sensing positioning valid region.

The differential line which connects the magnetic sensing coils in series in the magnetic signal sensing coil unit is positioned outside a magnetic sensing positioning valid region.

The detection control circuit includes a multichotomous array switch, a pre-stage signal amplifier, a gain controlled amplifier, a band-pass amplifier, an ac/dc converter, an integrating circuit, a direct current amplifier, a charge and discharge switch and a processor;

wherein one side of the multichotomous array switch is respectively connected with the horizontal magnetic sensing coil and the vertical magnetic sensing coil, while the other side thereof is connected with the pre-stage signal amplifier, and the pre-stage signal amplifier is connected with the gain controlled amplifier;

one end of the gain controlled amplifier leads to the processor, while the other end leads to the band-pass amplifier, and the band-pass amplifier is connected with the integrating circuit via the ac/dc converter; and one end of the integrating circuit leads to the processor via the direct current amplifier, while the other end leads to the charge and discharge switch, and the processor respectively leads to the multichotomous array switch and the charge and discharge switch.

A middleware is further arranged between the display component and the magnetic signal sensing component.

The magnetic signal output component is an electromagnetic stylus, and a head end of the electromagnetic stylus is an alternating electromagnetic signal source.

The magnetic signal sensing coils arranged in the horizontal encoding array and the magnetic signal sensing coils arranged in the vertical encoding array are intersected with each other and are arranged in a combination manner.

The combination are set as follows: the combination in pairs between any magnetic signal sensing coil on any magnetic signal sensing coil unit in the horizontal encoding array and the vertical encoding array and the magnetic sensing coil on other adjacent front or rear magnetic signal sensing coil unit are not repeated with the combination in pairs at any other position; and the magnetic sensing coil on the same magnetic signal sensing coil unit does not continuously participate in the combination in pairs at any position.

The combination of any two magnetic sensing coils with adjacent positions in the horizontal encoding array and the vertical encoding array are unique.

The present invention has the following beneficial effects:

The magnetic signal coil units of the magnetic signal positioning sensor are composed of multiple magnetic sensing channel coils which are connected in series, each magnetic signal sensing coil unit connected in series can detect the alternating magnetic signal source at multiple positions at the same time, in this way, the wiring of an outgoing line of the electromagnetic sensing channel coil becomes simpler, the locking time in scanning and detection by the magnetic signal positioning sensor on the alternating magnetic signal source is short, the speed is high, the precision in positioning sensing is high, the long-distance movement accumulative error is small and the device and wiring are simple and clear.

BRIEF DESCRIPTION OF THE DRAWINGS

In order to more clearly illustrate the technical solutions in the embodiments of the present invention or in the prior art, a brief introduction will be given below on the accompanying drawings which need to be used in the description of the embodiments or the prior art. Apparently, the drawings described below are merely some embodiments of the present invention, for those skilled in the art, other drawings can be obtained based on the structures shown in these drawings without any creative effort.

FIG. 11 is a structural schematic diagram of another embodiment in the present invention.

DETAILED DESCRIPTION OF THE EMBODIMENTS

Figure 1:
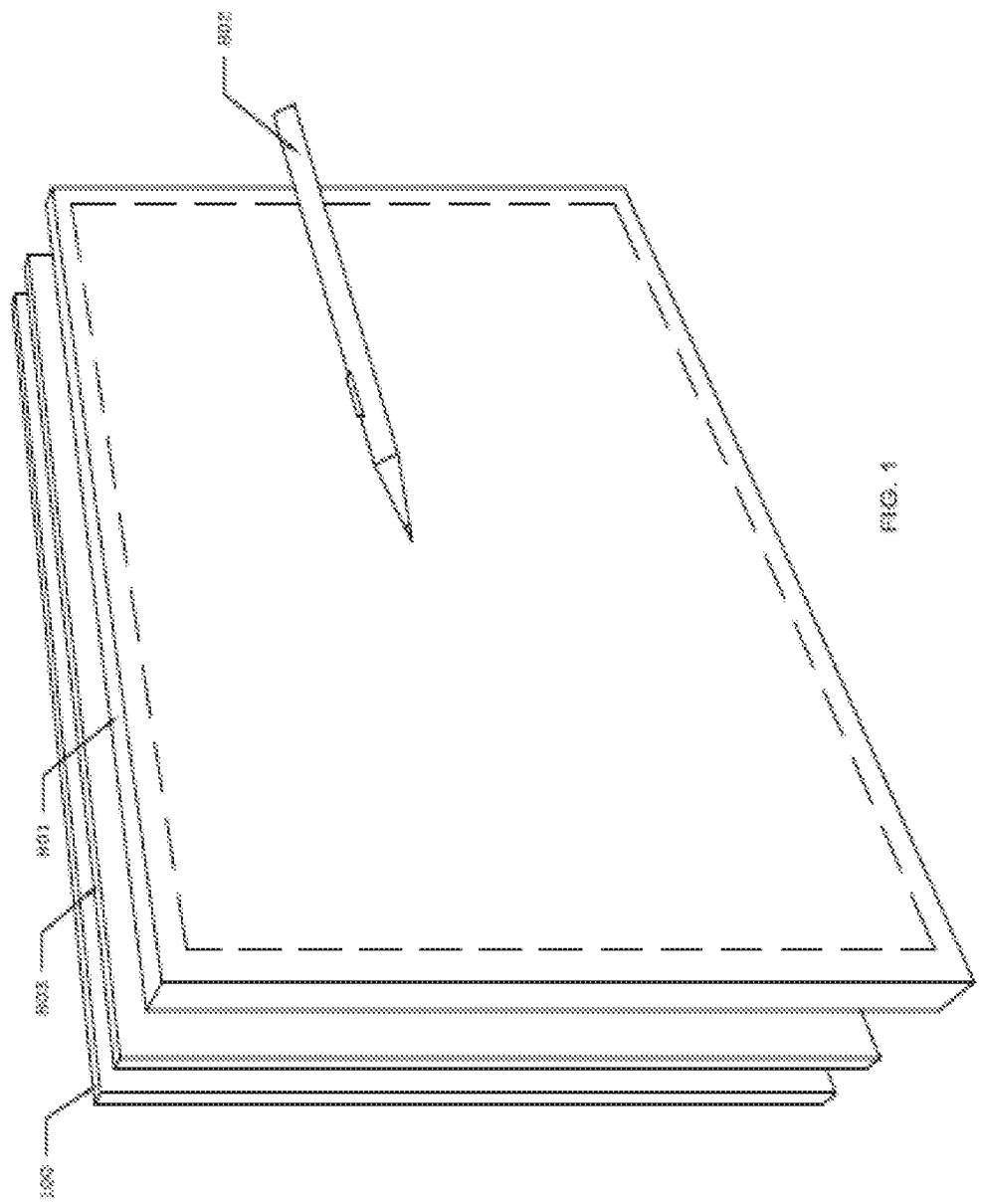
FIG. 1 is a schematic diagram of the whole structure of the present invention.
Figure 2:
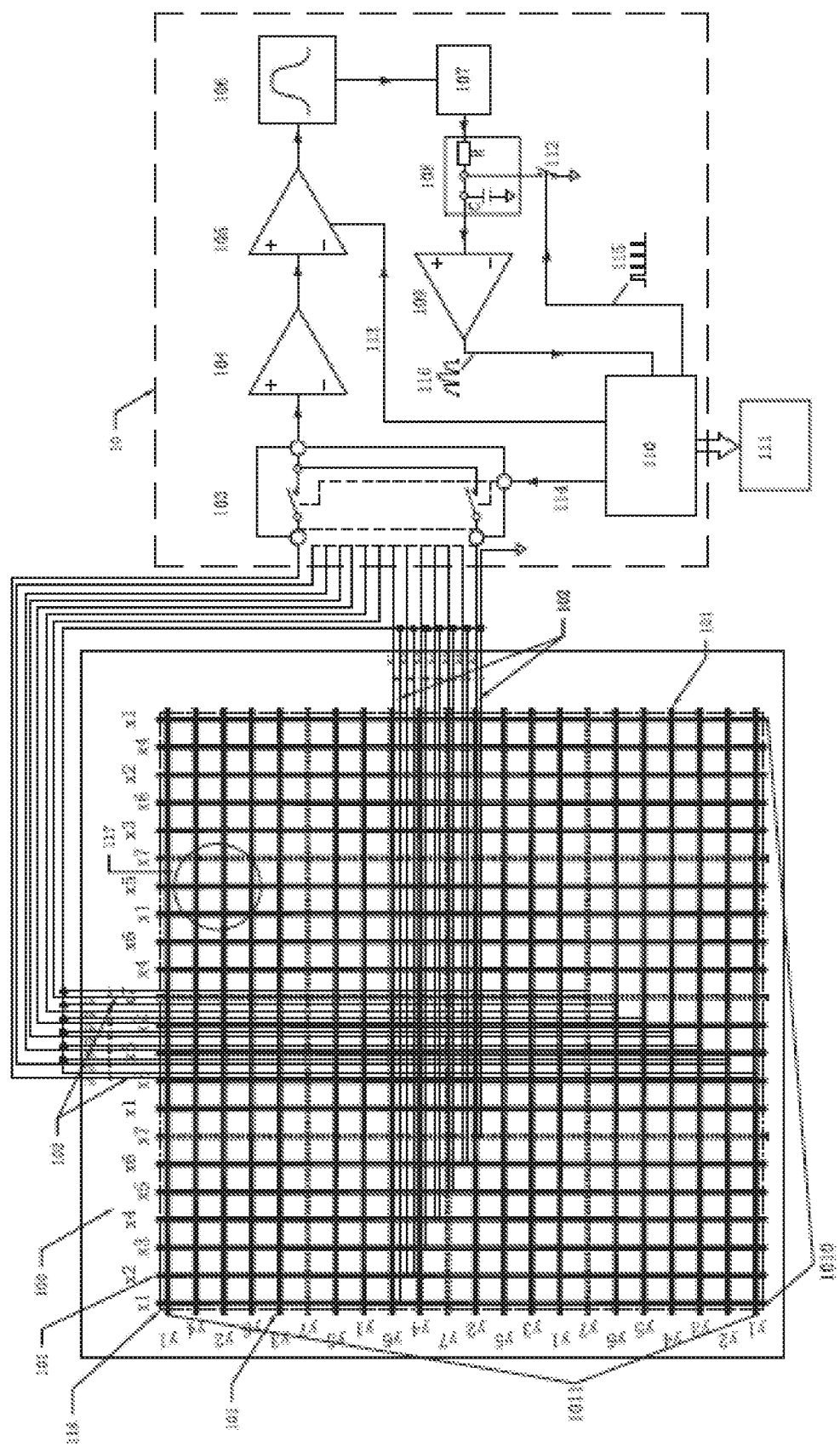
FIG. 2 is a structural schematic diagram of the magnetic signal sensing component in the present invention.
Figure 3:
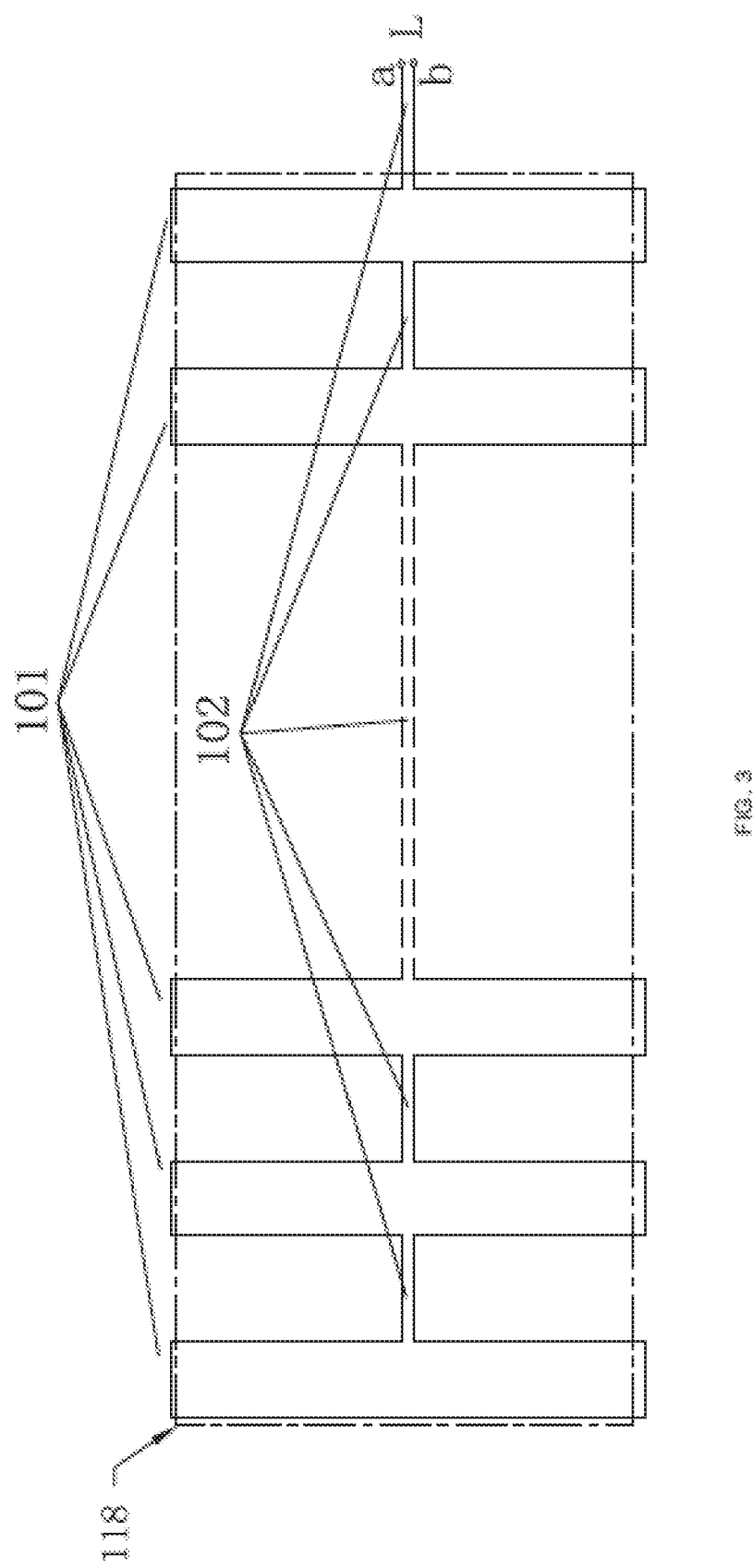
FIG. 3 is a structural schematic diagram of the magnetic sensing unit with a differential line being arranged within the valid region in the present invention.
Figure 4:
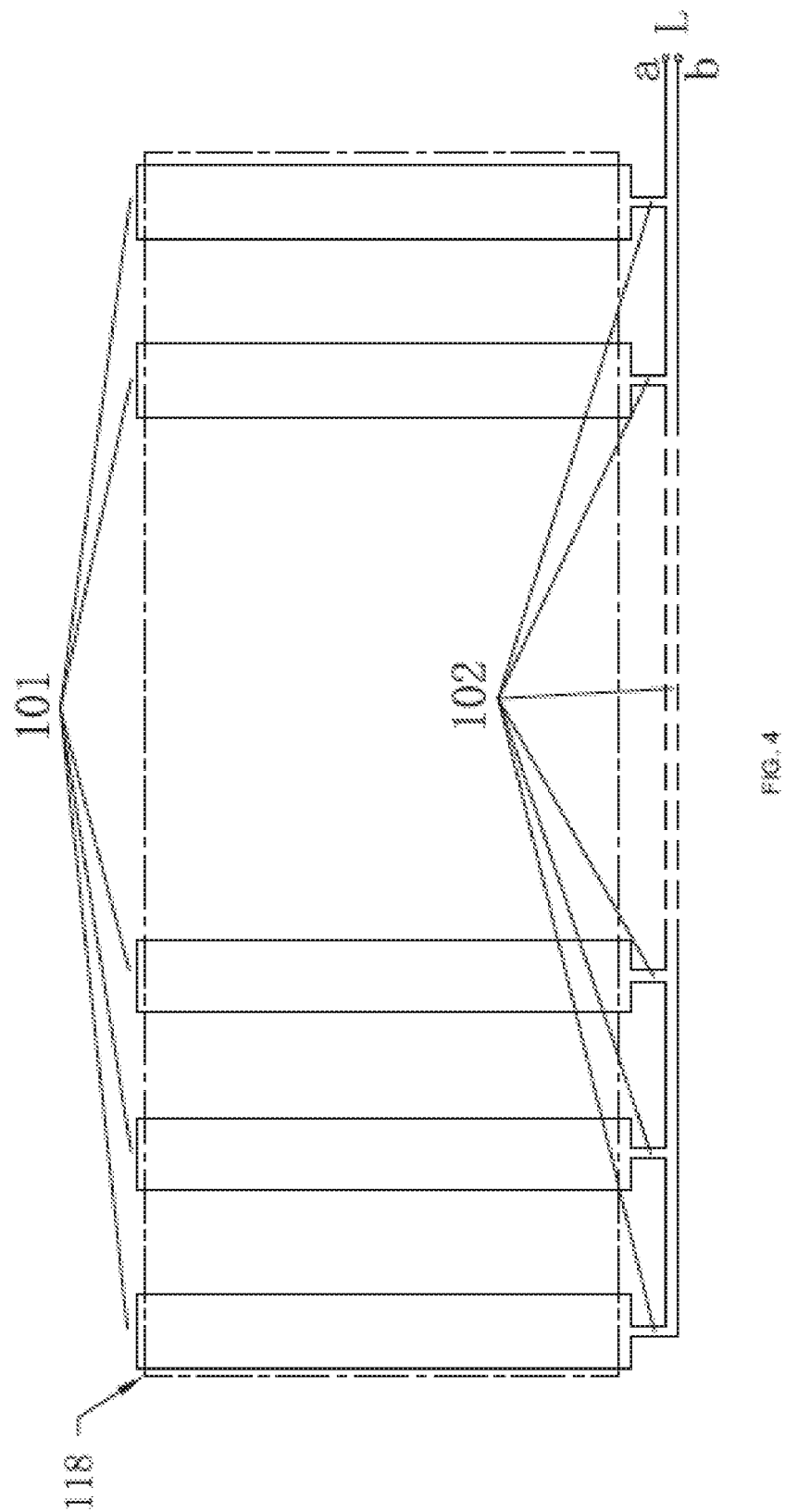
FIG. 4 is a structural schematic diagram of the magnetic sensing unit with a differential line being arranged outside the valid region in the present invention.
Figure 5:
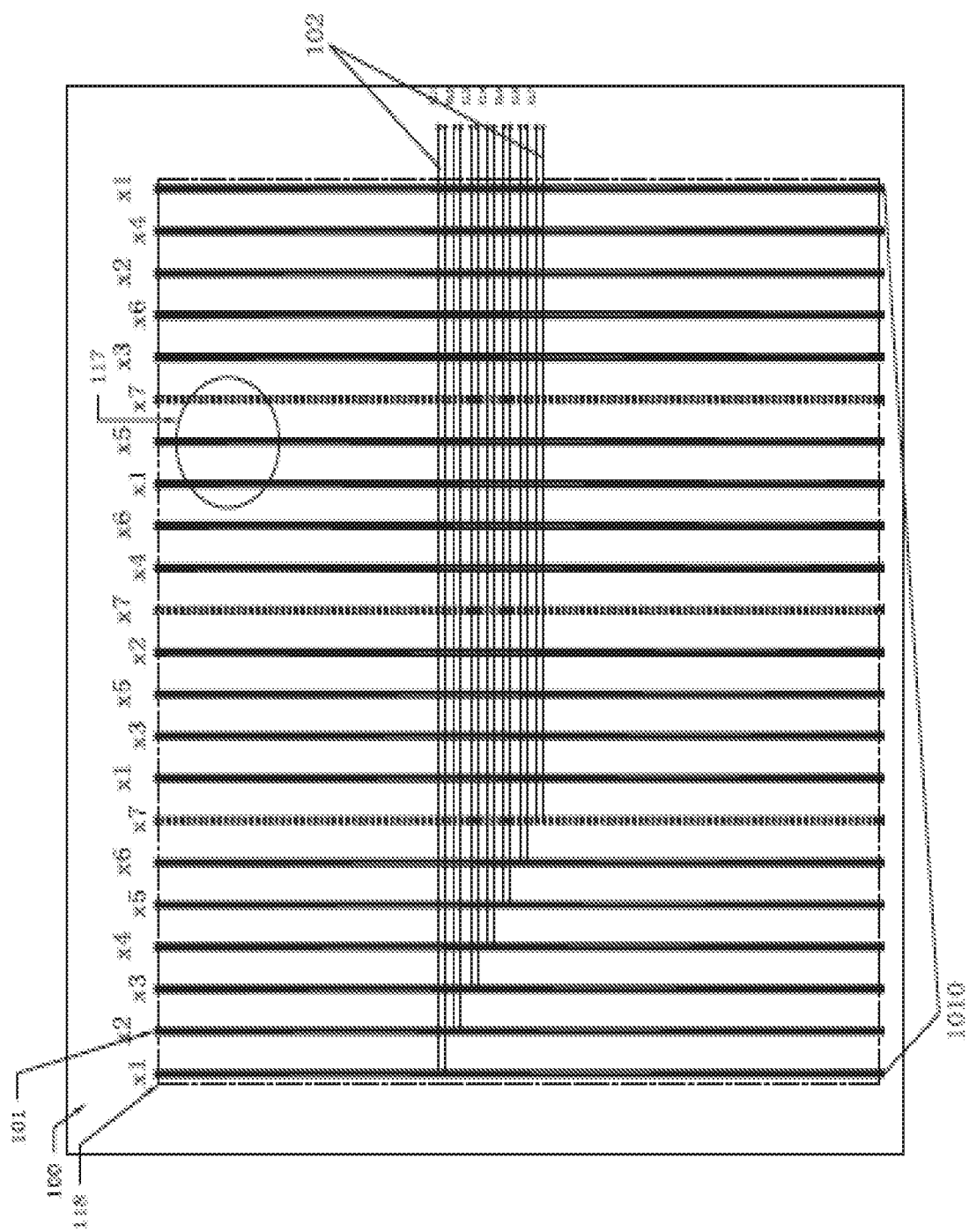
FIG. 5 is a schematic diagram of the horizontal array encoding structure with a differential line being arranged within the valid region in the present invention.
Figure 6:
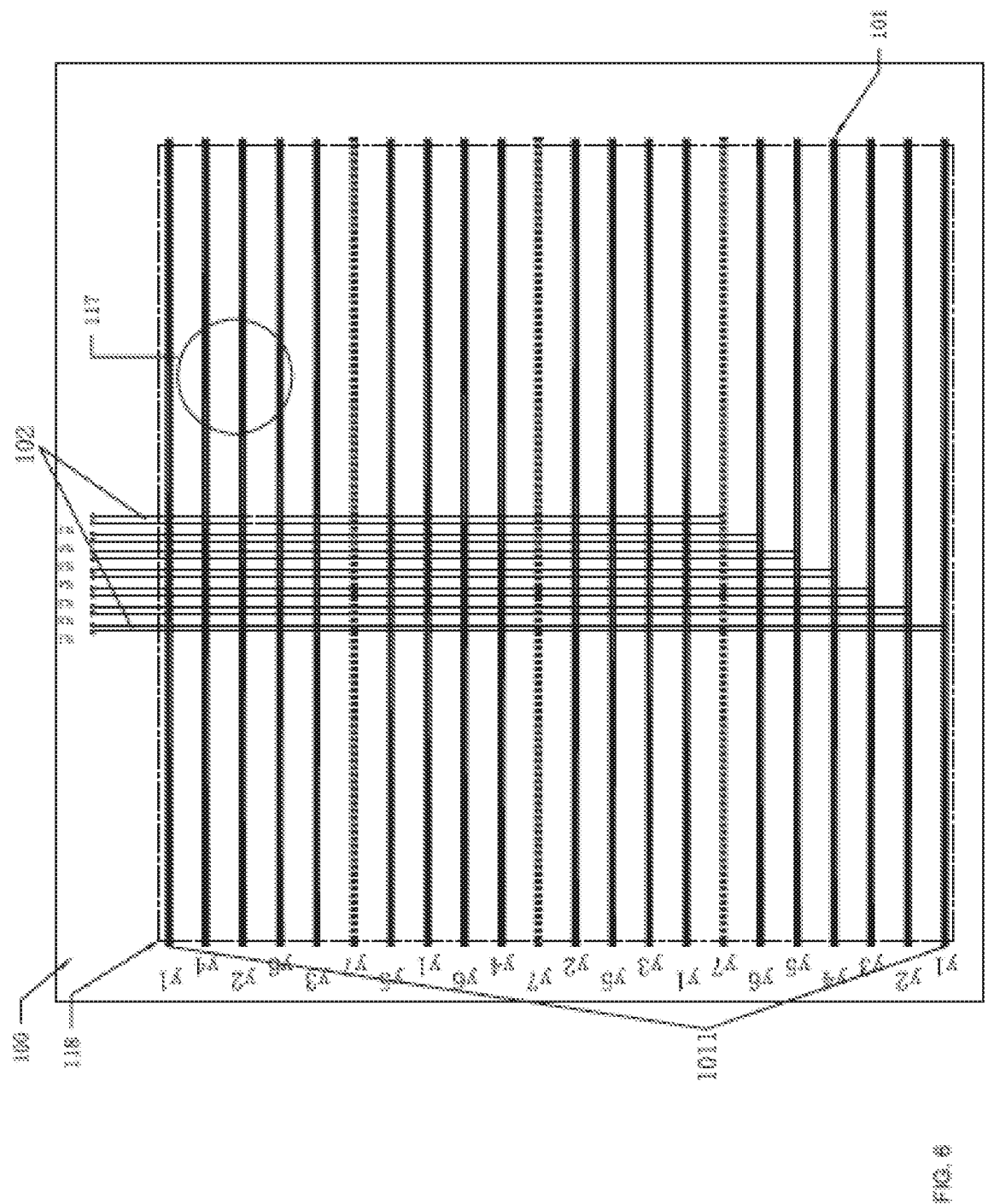
FIG. 6 is a schematic diagram of the vertical array encoding structure with differential line being arranged within the valid region in the present invention.

A clear and complete description will be given below on the technical solutions in the embodiments of the present invention in combination with the accompanying drawings in the present invention. Apparently, the described embodiments are merely a part, rather than all of the embodiments of the present invention.

Based on the embodiments in the present invention, all of the other embodiments obtained by those skilled in the art without any creative effort shall all fall within the protection scope of the present invention.

It should be noted that, all the directional indications (such as up, down, left, right, front, rear . . . ) in the embodiments of the present invention are merely used for explaining the relative positional relationship and movement conditions and the like between each part under a certain posture (as shown in the drawings), if such a posture changes, then the directional indications are changed correspondingly.

In the present invention, such description involving "first" and "second" and the like are merely for the purpose of description, but cannot be understood as indicating or implying its relative importance or implicitly indicating the quantity of the indicated technical features. Therefore, the feature defined with "first" and "second" can explicitly or implicitly include at least one such feature.

In the description of the present invention, "multiple" means at least two, for example, two, three and the like, unless otherwise specifically defined.

In the present invention, unless otherwise definitely prescribed and defined, the terms "connection", "connected", "fixed" and the like should be understood in its broad sense. For example, the "connection" may be a fixed connection, may also be a detachable connection or an integrated connection; may be a mechanical connection, may also be an electrical connection; and the "connected" can be directly connected and can also be indirectly connected through an intermediate medium, and can also be the internal communication inside two elements or an interaction relationship between two elements, unless otherwise definitely defined. The specific meaning of the above-mentioned terms in the present invention may be understood by those of ordinary skill in the art in light of specific circumstances.

In addition, the technical solutions between each embodiment in the present invention can be mutually combined, but should be on the basis that the technical solutions can be realized by those skilled in the art, when the combination of the technical solutions is contradictory or cannot be realized, it should be deemed that the combination of technical solutions does not exist and does not fall within the protection scope claimed by the present invention.

A handwriting input device includes a display component, a magnetic signal sensing component arranged at a random position within a range of 100 mm away from the display component in front or rear of the display component, and a magnetic signal output component arranged corresponding to the magnetic signal sensing component, wherein the display component, the magnetic signal sensing component and the magnetic signal output component are all arranged in a shell, and the shell is further provided with a mainboard;

wherein the magnetic signal sensing component includes a sensing element and a detection control circuit which is connected with the sensing element, the sensing element includes a horizontal encoding array and a vertical encoding array which is vertical to the horizontal encoding array, and both the horizontal encoding array and the vertical encoding array consist of magnetic signal sensing coil units.

The horizontal encoding array is composed of more than one magnetic signal sensing coil unit; the vertical encoding array is composed of more than one magnetic signal sensing coil unit; the magnetic signal sensing coil unit is formed by at least two magnetic sensing coils which are connected in series via a differential line; and the magnetic sensing coil is constituted by continuous loop wires of 1 circle to 10 circles.

The differential line which connects the magnetic sensing coils in series in the magnetic signal sensing coil unit is positioned within a magnetic sensing positioning valid region.

The differential line which connects the magnetic sensing coils in series in the magnetic signal sensing coil unit is positioned outside a magnetic sensing positioning valid region.

The detection control circuit includes a multichotomous array switch, a pre-stage signal amplifier, a gain controlled amplifier, a band-pass amplifier, an ac/dc converter, an integrating circuit, a direct current amplifier, a charge and discharge switch and a processor;

wherein one side of the multichotomous array switch is respectively connected with the horizontal magnetic sensing coil and the vertical magnetic sensing coil, while the other side thereof is connected with the pre-stage signal amplifier, and the pre-stage signal amplifier is connected with the gain controlled amplifier;

one end of the gain controlled amplifier leads to the processor, while the other end leads to the band-pass amplifier, and the band-pass amplifier is connected with the integrating circuit via the ac/dc converter; and one end of the integrating circuit leads to the processor via the direct current amplifier, while the other end leads to the charge and discharge switch, and the processor respectively leads to the multichotomous array switch and the charge and discharge switch.

A middleware is further arranged between the display component and the magnetic signal sensing component.

The magnetic signal output component is an electromagnetic stylus, and a head end of the electromagnetic stylus is an alternating electromagnetic signal source.

The magnetic signal sensing coils arranged in the horizontal encoding array and the magnetic signal sensing coils arranged in the vertical encoding array are intersected with each other and are arranged in a combination manner.

The combination are set as follows: the combination in pairs between any magnetic signal sensing coil on any magnetic signal sensing coil unit in the horizontal encoding array and the vertical encoding array and the magnetic sensing coil on other adjacent front or rear magnetic signal sensing coil unit are not repeated with the combination in pairs at any other position; and the magnetic sensing coil on the same magnetic signal sensing coil unit does not continuously participate in the combination in pairs at any position.

The combination of any two magnetic sensing coils with adjacent positions in the horizontal encoding array and the vertical encoding array are unique.

The material of the magnetic sensing coil is an alloy material, the alloy material is prepared from alloys in the following mass ratio: $(Fe_xCo_{1-x})_a(Ni_{1-y-z}Al_yCe_z)_bCu_cB_dSi_eCr_f$, wherein a=30-60, b=30-55, c=1-5, d=1-8, e=1-5, f=1-5, x=0.1-0.8, y=0.1-0.5, z=0.01-0.08; and the preparation method of the alloy includes the following steps:

Step I, preparation of nano-alloy powder: adopting iron powder, nickel powder, chromium powder and copper powder as a base powder, wherein the adopted iron powder has a granularity of 60-100 μm and a purity of greater than or equal to 99%; the nickel powder has a granularity of 3-6 μm and a purity of greater than 99%; the chromium powder has a granularity of 80-120 μm and a purity of greater than or equal to 99.9%; and the copper powder has a granularity of 50-130 μm and a purity of greater than or equal to 99.9%;

configuring the iron powder, the nickel powder, the chromium powder and the copper powder at a mass ratio of 20-40:15-30:1-6:1-5 into a mixed powder, adding anhydrous ethanol and stirring evenly, placing the mixed powder into a sealed pot, and performing planetary ball milling on a planetary ball mill at normal temperature for 100-190 h to obtain Fe—Ni—Cu—Cr nano-alloy powder with a particle size of 1-10 nm, wherein the mass ratio of the base powder to anhydrous ethanol is 1-2:0.5-3;

Step II, Preparation of an Alloy Powder Matrix based on a mass ratio of the alloy, drying the nano-alloy powder obtained in step and adding powder Si, Al, Co, Ce and B, placing the above raw materials in a vacuum induction furnace, smelting at a temperature of 1000-1500° C., repeatedly smelting for 2-4 times, with each smelting lasting for 30-120 min, after the completion of smelting, casting blank under the protection of helium, cooling to obtain an alloy ingot, placing the cooled alloy ingot in the sealed pot, performing planetary ball milling on a planetary ball mill at normal temperature for 50-200 h to obtain an alloy powder matrix with a granularity of smaller than 15 nm, wherein the purity of Si, Al, Co, Ce and B reaches over 99.8%, the particle size of Si is 10-100 μm, the particle size of Al is 10-80 μm, the particle size of Co is 10-120 μm, the particle size of Ce is 10-90 μm, and the particle size of B is 10-110 μm;

Step III, Sintering performing sinter molding on the alloy powder matrix obtained in step II in an argon-atmosphere sintering furnace, during sintering, firstly pre-sintering for 1-3 h under 400-500° C. at a heating rate of 10-15° C./min, and then sintering for 5-8 h under 1250-1350° C. at a heating rate of 30-40° C./min to obtain a basic alloy;

Step IV, Quenching placing the basic alloy sintered in step III in a quenching furnace for quenching, firstly keeping the quenching temperature of 1100-1200° C. for 15-25 min, and then lowering the temperature to 50-80° C. within 5-10 min and keeping the temperature for 30-40 min;

Step V, Annealing Treatment placing the basic alloy obtained by quenching in step IV in an argon-atmosphere annealing furnace, firstly heating to 450-455° C. and keeping the temperature for 1-2 h, then heating to 525-535° C. and keeping the temperature for 2-3 h, then heating to 720° C. and keeping the temperature for 3-4 h, stopping heating, lowering the temperature to 150-170° C. within 30-40 min, then cooling naturally to room temperature to obtain an alloy;

Step VI, Processing performing cutting processing on the alloy obtained in step V to obtain coils of required shapes.

A preferable ratio of alloys in the embodiment is as follows:

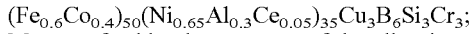

More preferably, the structure of the alloy is as follows: the alloy forms an α-Fe phase, a Co-doped α-Fe phase and an amorphous phase, wherein the α-Fe phase and the Co-doped α-Fe phase constitute a first phase, the particle size of the α-Fe phase and the Co-doped α-Fe phase in the first phase is in a range of 1-15 nm, a boundary phase is formed between the first phase and the amorphous phase, wherein the saturation magnetization of the first phase is about 1.52 T, the phase interface is an interface with a thickness of 1-1.5 nm, and the content of Ni in the first phase is 1.5 times that in the amorphous phase.

In step I, a preferable ball milling time is 152 h.

In step V, more preferably, placing the basic alloy obtained by quenching in step IV in an argon-atmosphere annealing furnace, firstly heating to 455° C. and keeping the temperature for 1.5 h, then heating to 530° C. and keeping the temperature for 2.5 h, then heating to 720° C. and keeping the temperature for 3.5 h, stopping heating, lowering the temperature to 150-170° C. within 30-40 min, then cooling naturally to room temperature to obtain an alloy.

Embodiment 1

As shown in FIG. 1, FIG. 2, FIG. 3 and FIG. 5 to FIG. 7, a handwriting input device includes a display component 801, a magnetic signal sensing component arranged at a random position on the display component 801, and a magnetic signal output component arranged corresponding to the magnetic signal sensing component, wherein the display component, the magnetic signal sensing component and the magnetic signal output component are all arranged in a shell, and the shell is further provided with a mainboard;

Wherein the magnetic signal sensing component includes a sensing element 100 and a detection control circuit 10 which is connected with the sensing element, the sensing element 100 is inserted into the detection control circuit via a connector or is directly welded onto the detection control circuit via thermal compression welding, the sensing element 100 includes a horizontal encoding array 1010 and a vertical encoding array 1011 which is vertical to the horizontal encoding array 1010, and both the horizontal encoding array 1010 and the vertical encoding array 1011 consist of magnetic signal sensing coil units.

Preferably, a magnetic signal sensing coil unit (FIG. 3) is formed by at least two magnetic sensing coils 101 which are connected in series via a differential line 102.

The magnetic sensing coil 101 is constituted by continuous loop wires of 1 circle to 10 circles;

the differential line 102 between the magnetic sensing coils 101 in the magnetic signal sensing coil unit (FIG. 3) is positioned within a magnetic sensing positioning valid region 118.

Preferably, the detection control circuit 10 includes a multichotomous array switch 103, a pre-stage signal amplifier 104, a gain controlled amplifier 105, a band-pass amplifier 106, an ac/dc converter 107, an integrating circuit 108, a direct current amplifier 109, a charge and discharge switch 112 and a processor 110;

wherein one side of the multichotomous array switch 103 is respectively connected with the horizontal magnetic sensing coil unit 1010 and the vertical magnetic sensing coil unit 1011, while the other side thereof is connected with the pre-stage signal amplifier 104, and the pre-stage signal amplifier 104 is connected with the gain controlled amplifier 105;

one end of the gain controlled amplifier 105 leads to the processor 110, while the other end leads to the band-pass amplifier 106, and the band-pass amplifier 106 is connected with the integrating circuit 108 via the ac/dc converter 107;

one end of the integrating circuit 108 leads to the processor 110 via the direct current amplifier 109, while the other end leads to the charge and discharge switch 112, and the processor 110 respectively leads to the multichotomous array switch 103 and the charge and discharge switch 112;

the detection control circuit 10 scans in sequence the horizontal magnetic signal sensing coil unit 1010 connected to the horizontal encoding array 1000 and the vertical magnetic signal sensing coil unit 1011 connected to the vertical encoding array 1001, performs amplitude-limiting and frequency-limiting amplifications in sequence on magnetic mutual-inductance signals of the magnetic signal sensing coil units, and performs ac/dc conversion on the finally amplified signals.

A converted dc level is controlled to perform regular discharge and charge on the integrating circuit 108, whether to charge the integrating circuit 108 in unit time and the level of the charged current in unit time directly and correspondingly determine whether magnetic mutual inductance signals of the magnetic signal sensing coil unit 101 exist or not and determine whether the magnetic mutual inductance signals are strong or weak, and a stronger signal means a closer distance to the alternating magnetic signal source 117.

Preferably, a middleware 803 is further arranged between the display component 801 and the magnetic signal sensing component.

The display component 801 is arranged at an end close to the user, the magnetic signal sensing component is arranged at an end far away from the user, and the middleware 803 cannot be or can be arranged with any metallic structure with not the whole surface being conductive.

Preferably, the magnetic signal output component is an electromagnetic stylus 802, and a head end of the electromagnetic stylus 802 is an alternating electromagnetic signal source 117.

Preferably, the magnetic signal sensing coils 101 arranged in the horizontal encoding array 1010 and the magnetic signal sensing coils 101 arranged in the vertical encoding array 1011 are intersected with each other and are arranged in a combination manner.

Preferably, the combination are set as follows: the combination in pairs between the magnetic signal sensing coil 101 at any position on the same magnetic signal sensing coil unit (FIG. 3) and the other adjacent front or rear magnetic signal sensing coil 101 which is connected in series therewith are not repeated with the combination in pairs at any other position.

The magnetic sensing coil 101 on the same magnetic signal sensing coil unit (FIG. 3) connected in series does not continuously participate in the combination in pairs at any position.

Preferably, the combination of any two adjacent magnetic sensing coils 101 in the horizontal encoding array 1010 and the vertical encoding array 1011 are unique; and the combination in pairs of adjacent magnetic sensing coils 101 in the horizontal encoding array 1010 and the vertical encoding array 1011 can be the same.

The material of the magnetic sensing coil is an alloy material, the alloy material is prepared from alloys in the following mass ratio: $(Fe_xCo_{1-x})_a(Ni_{1-y-z}Al_yCe_z)_bCu_cB_dSi_eCr_f$, wherein a=30-60, b=30-55, c=1-5, d=1-8, e=1-5, f=1-5, x=0.1-0.8, y=0.1-0.5, z=0.01-0.08; and the preparation method of the alloy includes the following steps:

Step I, preparation of nano-alloy powder: adopting iron powder, nickel powder, chromium powder and copper powder as a base powder, wherein the adopted iron powder has a granularity of 60-100 µm and a purity of greater than or equal to 99%; the nickel powder has a granularity of 3-6 µm and a purity of greater than 99%; the chromium powder has a granularity of 80-120 µm and a purity of greater than or equal to 99.9%; and the copper powder has a granularity of 50-130 µm and a purity of greater than or equal to 99.9%;

configuring the iron powder, the nickel powder, the chromium powder and the copper powder at a mass ratio of 20-40:15-30:1-6:1-5 into a mixed powder, adding anhydrous ethanol and stirring evenly, placing the mixed powder into a sealed pot, and performing planetary ball milling on a planetary ball mill at normal temperature for 100-190 h to obtain Fe—Ni—Cu—Cr nano-alloy powder with a particle size of 1-10 nm, wherein the mass ratio of the base powder to anhydrous ethanol is 1-2:0.5-3;

Step II, Preparation of an Alloy Powder Matrix based on a mass ratio of the alloy, drying the nano-alloy powder obtained in step and adding powder Si, Al, Co, Ce and B, placing the above raw materials in a vacuum induction furnace, smelting at a temperature of 1000-1500° C., repeatedly smelting for 2-4 times, with each smelting lasting for 30-120 min, after the completion of smelling, casting blank under the protection of helium, cooling to obtain an alloy ingot, placing the cooled alloy ingot in the sealed pot, performing planetary ball milling on a planetary ball mill at normal temperature for 50-200 h to obtain an alloy powder matrix with a granularity of smaller than 15 nm, wherein the purity of Si, Al, Co, Ce and B reaches over 99.8%, the particle size of Si is 10-100 μm, the particle size of Al is 10-80 μm, the particle size of Co is 10-120 μm, the particle size of Ce is 10-90 μm, and the particle size of B is 10-110 μm;

Step III, Sintering performing sinter molding on the alloy powder matrix obtained in step II in an argon-atmosphere sintering furnace, during sintering, firstly pre-sintering for 1-3 h under 400-500° C. at a heating rate of 10-15° C./min, and then sintering for 5-8 h under 1250-1350° C. at a heating rate of 30-40° C./min to obtain a basic alloy;

Step IV, Quenching placing the basic alloy sintered in step III in a quenching furnace for quenching, firstly keeping the quenching temperature of 1100-1200° C. for 15-25 min, and then lowering the temperature to 50-80° C. within 5-10 min and keeping the temperature for 30-40 min;

Step V, Annealing Treatment placing the basic alloy obtained by quenching in step IV in an argon-atmosphere annealing furnace, firstly heating to 450-455° C. and keeping the temperature for 1-2 h, then heating to 525-535° C. and keeping the temperature for 2-3 h, then heating to 720° C. and keeping the temperature for 3-4 h, stopping heating, lowering the temperature to 150-170° C. within 30-40 min, then cooling naturally to room temperature to obtain an alloy;

Step VI, Processing performing cutting processing on the alloy obtained in step V to obtain coils of required shapes.

A preferable ratio of alloys in the embodiment is as follows:

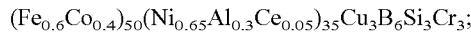

$(Fe_{0.6}Co_{0.4})_{50}(Ni_{0.65}Al_{0.3}Ce_{0.05})_{35}Cu_3B_6Si_3Cr_3$;

More preferably, the structure of the alloy is as follows: the alloy forms an α-Fe phase, a Co-doped α-Fe phase and an amorphous phase, wherein the α-Fe phase and the Co-doped α-Fe phase constitute a first phase, the particle size of the α-Fe phase and the Co-doped α-Fe phase in the first phase is in a range of 1-15 nm, a boundary phase is formed between the first phase and the amorphous phase, wherein the saturation magnetization of the first phase is about 1.52 T, the phase interface is an interface with a thickness of 1-1.5 nm, and the content of Ni in the first phase is 1.5 times that in the amorphous phase.

In step I, a preferable ball milling time is 152 h.

In step V, more preferably, placing the basic alloy obtained by quenching in step IV in an argon-atmosphere annealing furnace, firstly heating to 455° C. and keeping the temperature for 1.5 h, then heating to 530° C. and keeping the temperature for 2.5 h, then heating to 720° C. and keeping the temperature for 3.5 h, stopping heating, lowering the temperature to 150-170° C. within 30-40 min, then cooling naturally to room temperature to obtain an alloy.

[Performance Test]

(I) Nano-Alloy Powder obtained in Step I

A Mode IBHV-525 vibrating sample magnetometer (VSM) from Japan Riken Denshi Company is adopted to measure the magnetic performance of samples.

1. Through researches on the XRD spectral line after ball milling, it is found that after ball milling is conducted for a period of time, diffraction peaks of Ni, Cr and Cu will basically disappear, this is because with the increase of the ball milling time, Fe forms supersaturated solid solution, completeness of crystals is destroyed, such that crystal grains participating in diffraction are decreased, then the peak height is gradually lowered, and the diffraction peaks of Ni, Cr and Cu are lowered until they basically disappear, which indicates that Ni, Cr and Cu are dissolved in Fe in a solid form, forming a supersaturated solid solution of Fe. Through researches, it is also found that due to this condition, the content of Cr is inversely proportional to the ball milling time; however, in the later period of ball milling, the particles become hardened, and the internal stress is increased, when an elastic limit is reached, the particles begin to be fragmented, when the powder is constantly refined, the powder also agglomerates. This is because in the ball milling process, multiple nanoscale powder is formed, while the surface energy and adsorption energy of the powder with the size reaching a nanoscale increase, thereby leading to agglomeration, therefore, at this ratio, the best ball milling time is 152 h;

2. As shown in Table 1, along with the increase of the content of Cr, the saturation magnetization of Fe—Ni—Cu—Cr alloy firstly rises and then decreases, and the saturation magnetization reaches its maximum value when the content of Cr is 3-6% and reaches its maximum value 172 ($\sigma_s/A \cdot m^2 \cdot kg^{-1}$) when the content of Cr is 5%; this is because the increase in the content of Cr will lead to an increase in the long-range order ferromagnetic phase in the alloy, however, Cr element has no magnetic moment, therefore, the specific saturation magnetization firstly rises and then decreases along with the increase in the content of Cr; along with the increase of the content of Cr, the permeability variation of the alloy realizes its tendency of firstly rising and then decreasing, then when the content of Cr is 5%, a best ratio of saturation magnetization to permeability is obtained.

TABLE 1

Performance Test of Nano-alloy Powder

| Content of Cr | Saturation magnetization ($\sigma_s/A \cdot m^2 \cdot kg^{-1}$) | Permeability increment |
|---|---|---|
| 0% | 124 | 0% |
| 1% | 147 | 1% |
| 3% | 151 | 2% |
| 5% | 172 | 3% |
| 7% | 150 | 1.5% |
| 9% | 131 | −1% |

(II)

(1) In the preparation process, Ce is added, such that Ce element is contained in the alloy to be doped with Ni. Through researches, it is found that since the alloy includes Cr, Ni and other large atoms at the same time, when large atoms are combined with small atoms to form an alloy, a Laves phase of an intermetallic compound can be generated, its atoms of different sizes are stacked in a unit cell in a most compact manner, its hardness is higher and has an outstanding strengthening effect. Along with the increase of the Ce element, a hard phase in the alloy is increased, enabling solid solution tissues in the alloy to be refined evenly, and leading to uneasy breaking off and peeling off of the alloy under the effect of an external force. Through researches, it is found that after friction, the surface of the alloy containing Ce seems to be smooth and flat, which proves that a supporting and protective effect of the friction matrix on the hard phase becomes larger, the hard phase is not easy to break off and peel off, thereby improving the abrasion resistance, the abrasion loss is decreased, the abrasion resistance is improved by over 20% to 30% compared with that of the alloy which is not added with Ce, moreover, an increase in the content of Ce leads to a decrease in the content of austenite in the alloy, thereby being capable of effectively improving a microstructure of the alloy surface and further improving the corrosion resistance of the alloy; however, it is also found that when the content of Ce increases to a certain extent, the abrasion resistance and corrosion resistance of the alloy are enhanced, but the magnetic conductivity tends to be decreased, this is because after the content of Ce increases to a certain extent, its effect in refining the crystal size of the alloy encounters a bottleneck, therefore, along with the increase in the content of Ce, the increase speed of the abrasion resistance slows down, as shown in Table 2, it is the best ratio when the content of Ce is 1.75%, wherein the ratio of the alloy is $(Fe_{0.6}Co_{0.4})_{50}(Ni_{0.65}Al_{0.3}Ce_{0.05})_{35}Cu_3B_6Si_3Cr_3$.

Abrasion test: the test is performed on an RRT2III type reciprocating friction and wear machine, a mating plate of samples in the abrasion test is white alundum sand sheets with a specification of 70 mm×1317 mm×10 mm and a granularity of 200 meshes, and the surface roughness of the sample is in a range of 018-014 μm. The test is conducted for 10 min at a speed of 150 r/s and a pressure of 28 MPa. Each sample is tested for 1600-1800 times with a test stroke of 75 m, the room temperature is 20-25° C., and the humidity is 23-26%. The test is conducted with no lubrication and is a dry friction test, and the abrasion loss is tested with a universal electronic analytical balance. The abrasion loss of the alloy added with no Ce is 0.019/mg;

Corrosion test: the corrosion medium is selected from $H_2SO_4$ (5%), HCl (5%) and NaOH (5%), all the samples are corroded for 24 h at a micro-boiling state, a weight loss method is adopted for corrosion test, the samples are firstly polished and burnished, before and after corrosion, the samples are soaked with acetone, rinsed with alcohol, and dried with a drier, and then a ten-thousandth balance is used to weigh the weight before and after corrosion to obtain the corrosion rate.

TABLE 2

Performance Test of Alloy

| Content of Ce | Corrosion rate (mg * cm$^{-2}$) | | | Abrasion loss/mg | Conductivity increment |
| --- | --- | --- | --- | --- | --- |
| | H$_2$SO$_4$ (5%) | HCl (5%) | NaOH (5%) | | |
| 0% | 0.010 | 0.19 | 0.0029 | 0.0190 | 0% |
| 1.0% | 0.030 | 0.10 | 0.0020 | 0.0145 | 1.0% |
| 1.5% | 0.028 | 0.091 | 0.0015 | 0.0135 | 1.5% |
| 1.75% | 0.025 | 0.089 | 0.0012 | 0.0125 | 1.5% |
| 2.0% | 0.024 | 0.088 | 0.0011 | 0.0125 | 1.0% |
| 2.5% | 0.022 | 0.088 | 0.0011 | 0.0124 | 1.0% |

(III)

In step III, sintering is performed through reheating treatment, firstly preheating is performed to raise the temperature for formal sintering. Through researches, it is found that the initial permeability after reheating treatment is better than that after one preheating treatment, and the permeability is 5-10% higher than that of the alloy after a single heating. Along with the increase of the temperature, the alloy will be subjected to structural relaxation, and changes towards a stable low internal energy state. Moreover, the heating rate of reheating process is far greater than that of first preheating process: "firstly pre-sintering for 1-3 h under 400-500° C. at a heating rate of 10-15° C./min, and then sintering for 5-8 h under 1250-1350° C. at a heating rate of 30-40° C./min", preferably, "firstly pre-sintering for 2 h under 400-500° C. at a heating rate of 12° C./min, and then sintering for 7 h under 1250-1350° C. at a heating rate of 35° C./min", the reheating rate is nearly three times that of the rate of first heating. Through researches, it is found that since the previous preheating has enabled the alloy to have a certain adaptive capacity, through rapid heating, the alloy of the materials is rapid and the crystallization is more sufficient, and the coupling effect between crystal grains is stronger, therefore, the material has a lower effective anisotropy constant and a higher initial permeability. It is known from experiments that, the initial permeability of the alloy sintered through reheating treatment is 3-7% higher than the initial permeability of the alloy sintered through single heating treatment, compared with the initial permeability of the alloy sintered through common reheating treatment, the initial permeability of the alloy obtained by adopting reheating treatment with the heating rate being three times the heating rate of first heating is improved by 4-8%;

(IV) the second step in the quenching step in the present invention adopts a rapid quenching step, through researches, it is found that the adopted rapid quenching step can enable the alloy to have a more favorable performance, improves the notched bar impact strength and hardness number of the alloy, and has no influence on the magnetic performance, in a quenching process of the alloy, the internal structure of the materials is subjected to phase transformation toughening, the Ce element can be partially soluble, such that Ce in a binding phase has no enough time to precipitate during quenching, thereby playing a role of solid melt strengthening, and dramatically improving the impact toughness and hardness number of the alloy. The impact toughness can reach 0.72-0.89 MJ/m$^2$, wherein after a comprehensive consideration, the impact toughness and other performances are the best when the ratio of the alloy materials is as follows: wherein the ratio of alloy is $(Fe_{0.6}Co_{0.4})_{50}(Ni_{0.65}Al_{0.3}Ce_{0.05})_{35}Cu_3B_6Si_3Cr_3$ and the content of Ce is about 135%, at this time, the impact toughness is 0.85 MJ/m$^2$, and the Rockwell hardness number is 38HRC.

(V) After the annealing step, the alloy forms an α-Fe phase, a Co-doped α-Fe phase and an amorphous phase, wherein the α-Fe phase and the Co-doped α-Fe phase constitute a first phase, the particle size of the α-Fe phase and the Co-doped α-Fe phase in the first phase is in a range of 1-15 nm, a boundary phase is formed between the first phase and the amorphous phase, wherein the saturation magnetization of the first phase is about 1.52 T, the phase interface is an interface with a thickness of 1-1.5 nm, and the content of Ni in the first phase is 1.5 times that in the amorphous phase;

In the present invention, firstly the nano-alloy powder is creatively prepared, then metal is added for smelting, in this way, Ni can enter a first phase constituted by an α-Fe phase and a Co-doped α-Fe phase. Through researches, it is found that when the content of Ni in the first phase is 1.5 times that in the amorphous phase, the saturation magnetization of the alloy is of the maximum value, and the saturation magnetization of the alloy is about 1.57 T.

(1) The annealing temperature in step V has a certain influence on the diameter of crystal grains of the alloy. In the heating process of the alloy, due to the existence of different metal elements, through researches, it is found that the elements in the first phase preferably nucleate by firstly heating to 455° C. and keeping the temperature for 1.5 h, and then the amorphous phase can obtain even and tiny nano structures by reheating to 530° C. and keeping the temperature for 2.5 h and then heating to 720° C. and keeping the temperature for 3.5 h. When the temperature is found to rise to 750° C. after reheating, the size of crystal grains sharply increases, which leads to an increase in magnetic anisotropy, and large crystal grains play a hindering role in the displacement of a domain boundary and the rotation of magnetic moment. Therefore, the best annealing temperature adopted in the present invention is as follows: "the elements in the first phase preferably nucleate by firstly heating to 455° C. and keeping the temperature for 1.5 h, and then reheating to 530° C. and keeping the temperature for 2.5 h and then heating to 720° C. and keeping the temperature for 3.5 h".

(2) Through researches, it is found that a thermal insulation process is needed in the annealing process, however, the time of thermal insulation has a close relationship with the magnetic performance of the alloy in the present invention, along with the extension of the thermal insulation time, the magnetic performance is lowered. As a great internal stress exists inside the alloy and solidification propelling modes are different in different parts, then a regional stress field is formed, after a temperature of 720° C. is kept for 3-4 h (a preferable thermal insulation time is 3.5 h), the internal stress of the alloy can be released sufficiently, the magnetocrystalline anisotropy is lowered, and the sub-stable structure inside the alloy tends to be stable, then the alloy shows an excellent soft magnetic properties. However, after the temperature of 720° C. is kept for over 4 h, due to the existence of a precipitated phase with a deteriorated magnetic performance, the magnetic performance of the alloy is reduced.

Embodiment 2

Please refer to FIG. 1, FIG. 2, FIG. 4 and FIG. 8 to FIG. 11, different from the embodiment, the differential line 102 is arranged outside the magnetic signal positioning valid region 118, the magnetic sensing coil 2 is made of transparent or opaque conductive material, the material is the same as that in embodiment 1, and the magnetic sensing coils 101 of the horizontal encoding array 1010 and the vertical encoding array 1011 are arranged in different devices.

The display component 801 is arranged at one end far away from the user, the sensing element 100 of the magnetic signal sensing component is arranged at one end close to the user, the middleware between the above two components is any random transparent component, which is beneficial for the arrangement of the sensing element 100 of the magnetic signal sensing component at the front of the display component 801.

Figure 7:
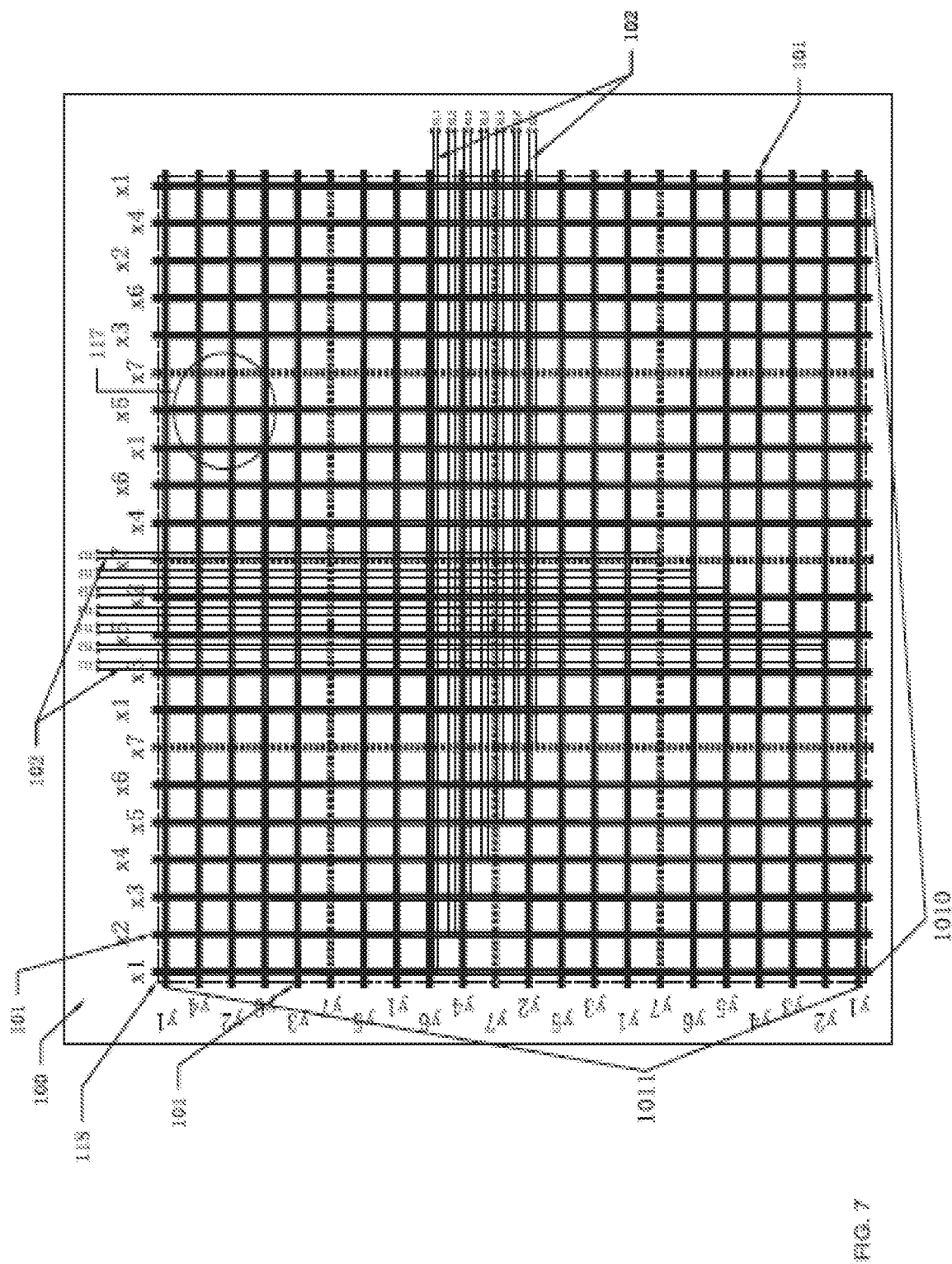
FIG. 7 is a schematic diagram of the sensing element with a differential line being arranged within the valid region in the present invention.
Figure 8:
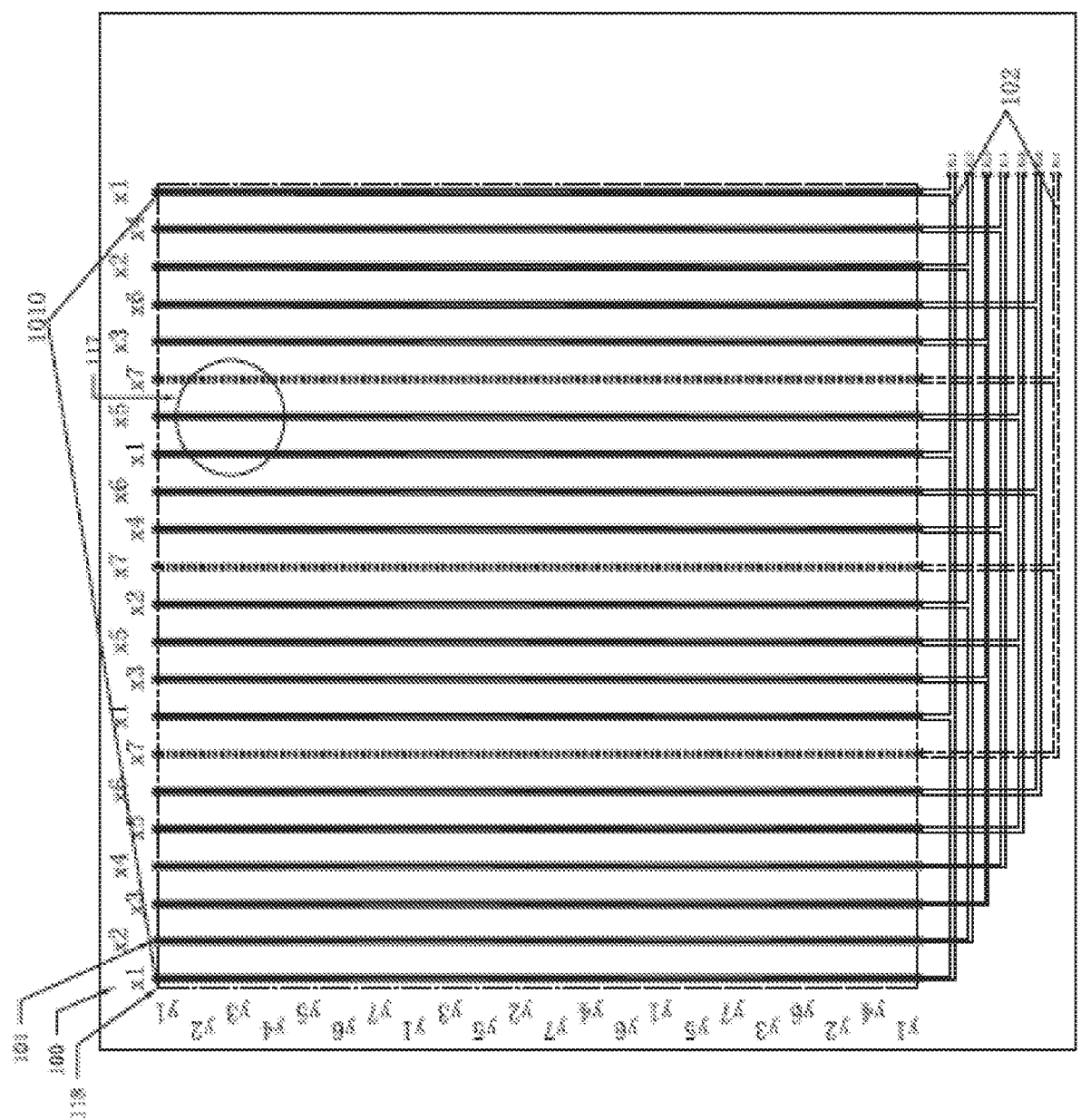
FIG. 8 is a schematic diagram of the horizontal array encoding structure with a differential line being arranged outside the valid region in the present invention.
Figure 9:
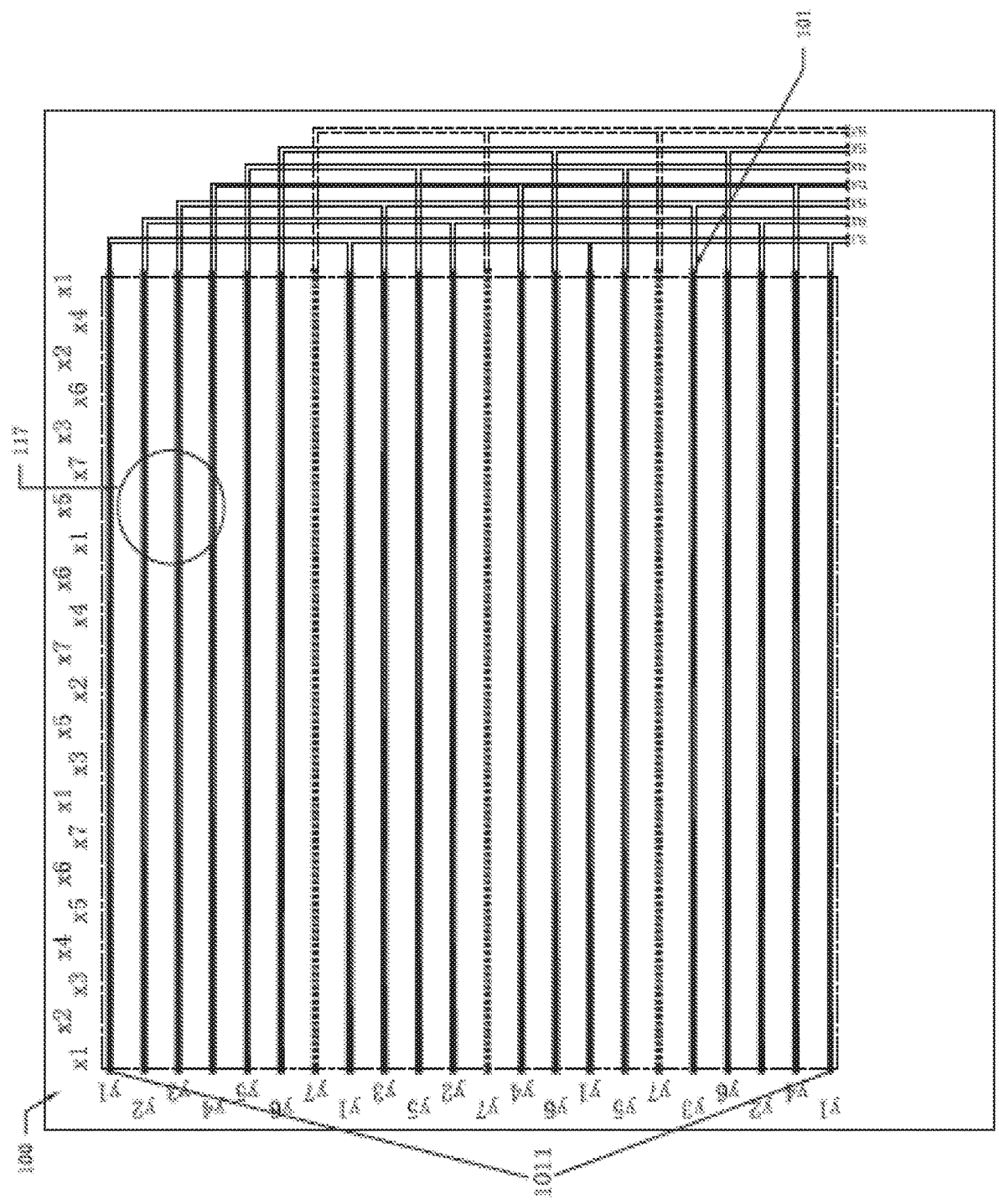
FIG. 9 is a schematic diagram of the vertical array encoding structure with a differential line being arranged outside the valid region in the present invention.
Figure 10:
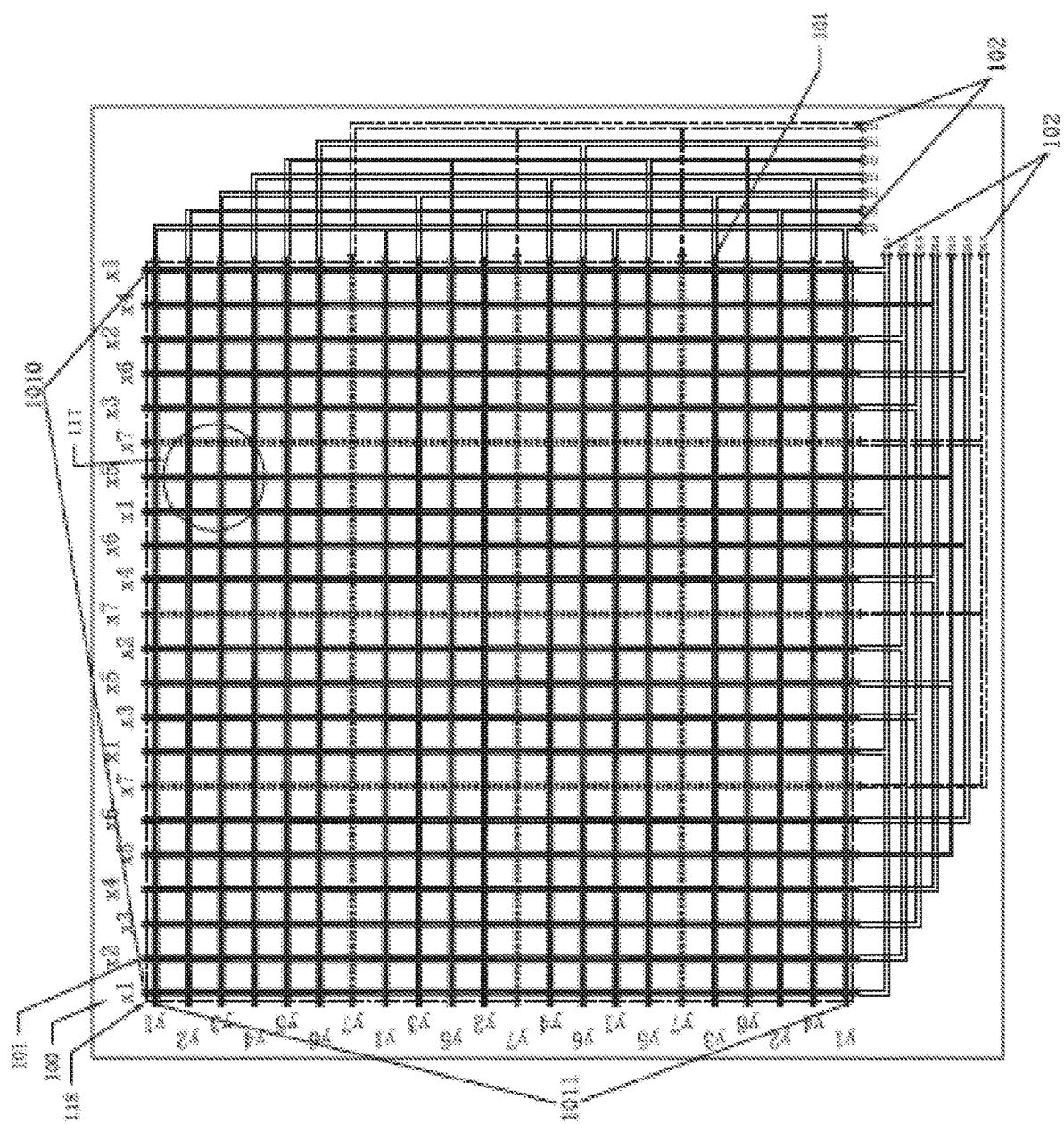
FIG. 10 is a schematic diagram of the sensing element with a differential line being arranged outside the valid region in the present invention.

The working principle is as follows:

Please refer to FIG. 7 and FIG. 10, an alternating magnetic signal source 117 on the electromagnetic stylus is close to the horizontal encoding array 1010 in the magnetic signal sensing component, some adjacent magnetic sensing coils 101 close to the alternating magnetic signal source 117 in the horizontal encoding array 1010, for example, x1, x5 and x7, are subjected to mutual inductance with the alternating magnetic signal source 117 to generate magnetic mutual inductance signals.

The combination codes of some adjacent horizontal magnetic sensing coils 101, such as x1, x5 and x7 generating such magnetic mutual inductance signals are x5$x$1, x5$x$7, x7$x$5, x1$x$5$x$7 or x7$x$5$x$1, the combination codes are the horizontal coordinate codes of the current alternating magnetic signal source 117 in the magnetic signal positioning valid region 118 of the horizontal encoding array 1010, the magnetic sensing coils 101 which generate stronger magnetic mutual inductance signals are determined to be closer to the alternating magnetic signal source 117.

Similarly, the alternating magnetic signal source 117 is close to the vertical encoding array 1011, some adjacent magnetic sensing coil units (FIG. 3), such as y6, y2 and y4 close to the alternating magnetic signal source 117 in the vertical encoding array 1011 are subjected to mutual inductance with the alternating magnetic signal source 117 to generate magnetic mutual inductance signals.

The combination codes of some adjacent magnetic sensing coils 101, such as y6, y2 and y4 generating such magnetic mutual inductance signals are y6$y$2, y2$y$6, y2$y$4, y4$y$2, y6$y$2$y$4 or y4$y$2$y$6, the combination codes are the vertical coordinate codes of the current alternating magnetic signal source 117 in the vertical encoding array 1011 and the magnetic signal positioning valid region 118, the magnetic sensing coils 101 which generate stronger magnetic mutual inductance signals are determined to be closer to the alternating magnetic signal source 117.

The combination codes x1$x$5, x5$x$1, x5$x$7, x7$x$5, x1$x$5$x$7 or x7$x$5$x$1 and y6$y$2, y2$y$6, y2$y$4, y4$y$2, y6$y$2$y$4 or y4$y$2$y$6 of x1, x5, x7 or y6, y2, y4 of some adjacent magnetic sensing coils 101 close to the alternating magnetic signal source 117 represent an approximate absolute coordinate position on the horizontal direction and vertical direction of the detected magnetic signal positioning valid region 118 of the sensing element 100 of the alternating magnetic signal source 117.

The alternating magnetic signal source 117 determines the position of the magnetic sensing coil 101 with the strongest magnetic mutual inductance signal at an approximate absolute coordinate position, for example the position of x5 of x1$x$5$x$7 and the position of y2 of y6$y$2$y$4, and then based on the ratio of the sensing magnetic mutual inductance signal strength of the magnetic sensing coils at two sides of the strongest magnetic sensing coil, the relative fine positions of the alternating magnetic signal source 117 corresponding to the magnetic sensing coils 101 at two sides in the region in which x5 channel of x1$x$5$x$7 and y2 channel of y6$y$2$y$4 of the strongest magnetic sensing coil are located are determined.

When the ratio of the magnetic mutual inductance signal strengths of magnetic sensing coils x1, x7 and y6, y4 at two sides of the strongest magnetic sensing coils x5 and y2 is 1:1, it represents that the alternating magnetic signal source 117 is located in the center position of the x5 and y2 channels of the strongest magnetic sensing coil, when the ratio is greater than 1:1, it represents that the alternating magnetic signal source 117 is positioned within the region in which the x5 channel and the y2 channel of the strongest magnetic sensing coils are located, and deviates to the less stronger magnetic sensing coil at one side, and the deviating distance is in direct proportion to the ratio, if the ratio is smaller than 1:1, it represents that the alternating magnetic signal source 117 is positioned within the region in which the x5 channel and y2 channel of the strongest magnetic sensing coil are located, and deviates to the less stronger magnetic sensing coil unit at the other side, and the deviating distance is in inverse proportion to the ratio.

Precise positioning information is transmitted from the magnetic signal sensing component via a mainboard to the display component for display, and can precisely express the position information expressed by users via an electromagnetic stylus.

The material of the magnetic sensing coil is an alloy material, the alloy material is prepared from alloys in the following mass ratio: $(Fe_xCo_{1-x})_a(Ni_{1-y-z}Al_yCe_z)_bCu_cB_d\text{-}Si_eCr_f$, wherein a=30-60, b=30-55, c=1-5, d=1-8, e=1-5, x=0.1-0.8, y=0.1-0.5, z=0.01-0.08; and the preparation method of the alloy includes the following steps:

Step I, preparation of nano-alloy powder: adopting iron powder, nickel powder, chromium powder and copper powder as a base powder, wherein the adopted iron powder has a granularity of 60-100 μm and a purity of greater than or equal to 99%; the nickel powder has a granularity of 3-6 μm and a purity of greater than 99%; the chromium powder has a granularity of 80-120 μm and a purity of greater than or equal to 99.9%; and the copper powder has a granularity of 50-130 μm and a purity of greater than or equal to 99.9%;

configuring the iron powder, the nickel powder, the chromium powder and the copper powder at a mass ratio of 20-40:15-30:1-6:1-5 into a mixed powder, adding anhydrous ethanol and stirring evenly, placing the mixed powder into a sealed pot, and performing planetary ball milling on a planetary ball mill at normal temperature for 100-190 h to obtain Fe—Ni—Cu—Cr nano-alloy powder with a particle size of 1-10 nm, wherein the mass ratio of the base powder to anhydrous ethanol is 1-2:0.5-3;

Step II, Preparation of an Alloy Powder Matrix based on a mass ratio of the alloy, drying the nano-alloy powder obtained in step I and adding powder Si, Al, Co, Ce and B, placing the above raw materials in a vacuum induction furnace, smelting at a temperature of 1000-1500° C., repeatedly smelting for 2-4 times, with each smelting lasting for 30-120 min, after the completion of smelting, casting blank under the protection of helium, cooling to obtain an alloy ingot, placing the cooled alloy ingot in the sealed pot, performing planetary ball milling on a planetary ball mill at normal temperature for 50-200 h to obtain an alloy powder matrix with a granularity of smaller than 15 nm, wherein the purity of Si, Al, Co, Ce and B reaches over 99.8%, the particle size of Si is 10-100 μm, the particle size of Al is 10-80 μm, the particle size of Co is 10-120 μm, the particle size of Ce is 10-90 μm, and the particle size of B is 10-110 μm;

Step III, Sintering performing sinter molding on the alloy powder matrix obtained in step II in an argon-atmosphere sintering furnace, during sintering, firstly pre-sintering for 1-3 h under 400-500° C. at a heating rate of 10-15° C./min, and then sintering for 5-8 h under 1250-1350° C. at a heating rate of 30-40° C./min to obtain a basic alloy;

Step IV, Quenching placing the basic alloy sintered in step III in a quenching furnace for quenching, firstly keeping the quenching temperature of 1100-1200° C. for 15-25 min, and then lowering the temperature to 50-80° C. within 5-10 min and keeping the temperature for 30-40 min;

Step V, Annealing Treatment placing the basic alloy obtained by quenching in step IV in an argon-atmosphere annealing furnace, firstly heating to 450-455° C. and keeping the temperature for 1-2 h, then heating to 525-535° C. and keeping the temperature for 2-3 h, then heating to 720° C. and keeping the temperature for 3-4 h, stopping heating, lowering the temperature to 150-170° C. within 30-40 min, then cooling naturally to room temperature to obtain an alloy;

Step VI, Processing performing cutting processing on the alloy obtained in step V to obtain coils of required shapes.

A preferable ratio of alloys in the embodiment is as follows:

$(Fe_{0.6}Co_{0.4})_{50}(Ni_{0.65}Al_{0.3}Ce_{0.05})_{35}Cu_3B_6Si_3Cr_3$;

More preferably, the structure of the alloy is as follows; the alloy forms an α-Fe phase, a Co-doped α-Fe phase and an amorphous phase, wherein the α-Fe phase and the Co-doped α-Fe phase constitute a first phase, the particle size of the α-Fe phase and the Co-doped α-Fe phase in the first phase is in a range of 1-15 nm, a boundary phase is formed between the first phase and the amorphous phase, wherein the saturation magnetization of the first phase is about 1.52 T, the phase interface is an interface with a thickness of 1-1.5 nm, and the content of Ni in the first phase is 1.5 times that in the amorphous phase.

In step I, a preferable ball milling time is 152 h.

In step V, more preferably, placing the basic alloy obtained by quenching in step IV in an argon-atmosphere annealing furnace, firstly heating to 455° C. and keeping the temperature for 1.5 h, then heating to 530° C. and keeping the temperature for 2.5 h, then heating to 720° C. and keeping the temperature for 3.5 h, stopping heating, lowering the temperature to 150-170° C. within 30-40 min, then cooling naturally to room temperature to obtain an alloy.

[Performance Test]

(I) Nano-Alloy Powder obtained in Step I

A Mode IBHV-525 vibrating sample magnetometer (VSM) from Japan Riken Denshi Company is adopted to measure the magnetic performance of samples.

1. Through researches on the XRD spectral line after ball milling, it is found that after ball milling is conducted for a period of time, diffraction peaks of Ni, Cr and Cu will basically disappear, this is because with the increase of the ball milling time, Fe forms supersaturated solid solution, the completeness of crystals is destroyed, such that crystal grains participating in diffraction are decreased, then the peak height is gradually lowered, and the diffraction peaks of Ni, Cr and Cu are lowered until they basically disappear, which indicates that Ni, Cr and Cu are dissolved in Fe in a solid form, forming a supersaturated solid solution of Fe. Through researches, it is also found that due to this condition, the content of Cr is inversely proportional to the ball milling time; however, in the later period of ball milling, the particles become hardened, and the internal stress is increased, when an elastic limit is reached, the particles begin to be fragmented, when the powder is constantly refined, the powder also agglomerates. This is because in the ball milling process, multiple nanoscale powder is formed, while the surface energy and adsorption energy of the powder with the size reaching a nanoscale increase, thereby leading to agglomeration, therefore, at this ratio, the best ball milling time is 152 h;

2. As shown in Table 1, along with the increase of the content of Cr, the saturation magnetization of Fe—Ni—Cu—Cr alloy firstly rises and then decreases, and the saturation magnetization reaches its maximum value when the content of Cr is 3-6% and reaches its maximum value 172 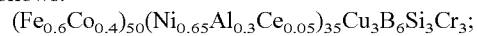 when the content of Cr is 5%; this is because the increase in the content of Cr will lead to an increase in the long-range order ferromagnetic phase in the alloy, however, Cr element has no magnetic moment, therefore, the specific saturation magnetization firstly rises and then decreases along with the increase in the content of Cr; along with the increase of the content of Cr, the permeability variation of the alloy realizes its tendency of firstly rising and then decreasing, then when the content of Cr is 5%, a best ratio of saturation magnetization to permeability is obtained.

TABLE 1

Performance Test of Nano-alloy Powder

| Content of Cr | Saturation magnetization ($\sigma_s$/A · m² · kg⁻¹) | Permeability increment |
|---|---|---|
| 0% | 124 | 0% |
| 1% | 147 | 1% |
| 3% | 151 | 2% |
| 5% | 172 | 3% |
| 7% | 150 | 1.5% |
| 9% | 131 | −1% |

(II)

(1) In the preparation process, Ce is added, such that Ce element is contained in the alloy to be doped with Ni. Through researches, it is found that since the alloy includes Cr, Ni and other large atoms at the same time, when large atoms are combined with small atoms to form an alloy, a Laves phase of an intermetallic compound can be generated, its atoms of different sizes are stacked in a unit cell in a most compact manner, its hardness is higher and has an outstanding strengthening effect. Along with the increase of the Ce element, a hard phase in the alloy is increased, enabling solid solution tissues in the alloy to be refined evenly, and leading to uneasy breaking off and peeling off of the alloy under the effect of an external force. Through researches, it is found that after friction, the surface of the alloy containing Ce seems to be smooth and flat, which proves that a supporting and protective effect of the friction matrix on the hard phase becomes larger, the hard phase is not easy to break off and peel off; thereby improving the abrasion resistance, the abrasion loss is decreased, the abrasion resistance is improved by over 20% to 30% compared with that of the alloy which is not added with Ce, moreover, an increase in the content of Ce leads to a decrease in the content of austenite in the alloy, thereby being capable of effectively improving a microstructure of the alloy surface and further improving the corrosion resistance of the alloy; however, it is also found that when the content of Ce increases to a certain extent, the abrasion resistance and corrosion resistance of the alloy are enhanced, but the magnetic conductivity tends to be decreased, this is because after the content of Ce increases to a certain extent, its effect in refining the crystal size of the alloy encounters a bottleneck, therefore, along with the increase in the content of Ce, the increase speed of the abrasion resistance slows down, as shown in Table 2, it is the best ratio when the content of Ce is 1.75%, wherein the ratio of the alloy is $(Fe_{0.6}Co_{0.4})_{50}(Ni_{0.65}Al_{0.3}Ce_{0.05})_{35}Cu_3B_6Si_3Cr_3$.

Abrasion test: the test is performed on an RRT2III type reciprocating friction and wear machine, a mating plate of samples in the abrasion test is white alundum sand sheets with a specification of 70 mm×1317 mm×10 mm and a granularity of 200 meshes, and the surface roughness of the sample is in a range of 018-014 μm. The test is conducted for 10 min at a speed of 150 r/s and a pressure of 28 MPa. Each sample is tested for 1600-1800 times with a test stroke of 75 m, the room temperature is 20-25° C., and the humidity is 23-26%, The test is conducted with no lubrication and is a dry friction test, and the abrasion loss is tested with a universal electronic analytical balance. The abrasion loss of the alloy added with no Ce is 0.019/mg;

Corrosion test: the corrosion medium is selected from $H_2SO_4$ (5%), HCl (5%) and NaOH (5%), all the samples are corroded for 24 h at a micro-boiling state, a weight loss method is adopted for corrosion test, the samples are firstly polished and burnished, before and after corrosion, the samples are soaked with acetone, rinsed with alcohol, and dried with a drier, and then a ten-thousandth balance is used to weigh the weight before and after corrosion to obtain the corrosion rate.

TABLE 2

Performance Test of Alloy

| Content of Ce | Corrosion rate (mg * cm⁻²) | | | Abrasion loss/mg | Conductivity increment |
|---|---|---|---|---|---|
| | $H_2SO_4$ (5%) | HCl (5%) | NaOH (5%) | | |
| 0% | 0.040 | 0.19 | 0.0029 | 0.0190 | 0% |
| 1.0% | 0.030 | 0.10 | 0.0020 | 0.0145 | 1.0% |
| 1.5% | 0.028 | 0.091 | 0.0015 | 0.0135 | 1.5% |
| 1.75% | 0.025 | 0.089 | 0.0012 | 0.0125 | 1.5% |
| 2.0% | 0.024 | 0.088 | 0.0011 | 0.0125 | 1.0% |
| 2.5% | 0.022 | 0.088 | 0.0011 | 0.0124 | 1.0% |

(III)

In step III, sintering is performed through reheating treatment, firstly preheating is performed to raise the temperature for formal sintering. Through researches, it is found that the initial permeability after reheating treatment is better than that after one preheating treatment, and the permeability is 5-10% higher than that of the alloy after a single heating. Along with the increase of the temperature, the alloy will be subjected to structural relaxation, and changes towards a stable low internal energy state. Moreover, the heating rate of reheating process is far greater than that of first preheating process: "firstly pre-sintering for 1-3 h under 400-500° C. at a heating rate of 10-15° C./min, and then sintering for 5-8 h under 1250-1350° C. at a heating rate of 30-40° C./min", preferably, "firstly pre-sintering for 2 h under 400-500° C. at a heating rate of 12° C./min, and then sintering for 7 h under 1250-1350° C. at a heating rate of 35° C./min", the reheating rate is nearly three times that of the rate of first heating. Through researches, it is found that since the previous preheating has enabled the alloy to have a certain adaptive capacity, through rapid heating, the alloy of the materials is rapid and the crystallization is more sufficient, and the coupling effect between crystal grains is stronger, therefore, the material has a lower effective anisotropy constant and a higher initial permeability. It is known from experiments that, the initial permeability of the alloy sintered through reheating treatment is 3-7% higher than the initial permeability of the alloy sintered through single heating treatment, compared with the initial permeability of the alloy sintered through common reheating treatment, the initial permeability of the alloy obtained by adopting reheating treatment with the heating rate being three times the heating rate of first heating is improved by 4-8%;

(IV) the second step in the quenching step in the present invention adopts a rapid quenching step, through researches, it is found that the adopted rapid quenching step can enable the alloy to have a more favorable performance, improves the notched bar impact strength and hardness number of the alloy, and has no influence on the magnetic performance, in a quenching process of the alloy, the internal structure of the materials is subjected to phase transformation toughening, the Ce element can be partially soluble, such that Ce in a binding phase has no enough time to precipitate during quenching, thereby playing a role of solid melt strengthening, and dramatically improving the impact toughness and hardness number of the alloy. The impact toughness can reach 0.72-0.89 MJ/m², wherein after a comprehensive consideration, the impact toughness and other performances are the best when the ratio of the alloy materials is as follows: wherein the ratio of alloy is $(Fe_{0.6}Co_{0.4})_{50}(Ni_{0.65}Al_{0.3}Ce_{0.05})_{35}Cu_3B_6Si_3Cr_3$ and the content of Ce is about 1.75%, at this time, the impact toughness is 0.85 MJ/m$^2$, and the Rockwell hardness number is 38HRC.

(V) After the annealing step, the alloy forms an α-Fe phase, a Co-doped α-Fe phase and an amorphous phase, wherein the α-Fe phase and the Co-doped α-Fe phase constitute a first phase, the particle size of the α-Fe phase and the Co-doped α-Fe phase in the first phase is in a range of 1-15 nm, a boundary phase is formed between the first phase and the amorphous phase, wherein the saturation magnetization of the first phase is about 1.52 T, the phase interface is an interface with a thickness of 1-1.5 nm, and the content of Ni in the first phase is 1.5 times that in the amorphous phase.

In the present invention, firstly the nano-alloy powder is creatively prepared, then metal is added for smelting, in this way, Ni can enter a first phase constituted by an α-Fe phase and a Co-doped α-Fe phase. Through researches, it is found that when the content of Ni in the first phase is 1.5 times that in the amorphous phase, the saturation magnetization of the alloy is of the maximum value, and the saturation magnetization of the alloy is about 1.57 T.

(1) The annealing temperature in step V has a certain influence on the diameter of crystal grains of the alloy. In the heating process of the alloy, due to the existence of different metal elements, through researches, it is found that the elements in the first phase preferably nucleate by firstly heating to 455° C. and keeping the temperature for 1.5 h, and then the amorphous phase can obtain even and tiny nano structures by reheating to 530° C. and keeping the temperature for 2.5 h and then heating to 720° C. and keeping the temperature for 3.5 h. When the temperature is found to rise to 750° C. after reheating, the size of crystal grains sharply increases, which leads to an increase in magnetic anisotropy, and large crystal grains play a hindering role in the displacement of a domain boundary and the rotation of magnetic moment. Therefore, the best annealing temperature adopted in the present invention is as follows: "the elements in the first phase preferably nucleate by firstly heating to 455° C. and keeping the temperature for 1.5 h, and then reheating to 530° C. and keeping the temperature for 2.5 h and then heating to 720° C. and keeping the temperature for 3.5 h".

(2) Through researches, it is found that a thermal insulation process is needed in the annealing process, however, the time of thermal insulation has a close relationship with the magnetic performance of the alloy in the present invention, along with the extension of the thermal insulation time, the magnetic performance is lowered. As a great internal stress exists inside the alloy and solidification propelling modes are different in different parts, then a regional stress field is formed, after a temperature of 720° C. is kept for 3-4 h (a preferable thermal insulation time is 3.5 h), the internal stress of the alloy can be released sufficiently, the magnetocrystalline anisotropy is lowered, and the sub-stable structure inside the alloy tends to be stable, then the alloy shows an excellent soft magnetic properties. However, after the temperature of 720° C. is kept for over 4 h, due to the existence of a precipitated phase with a deteriorated magnetic performance, the magnetic performance of the alloy is reduced.

What is described above is merely preferred embodiments of the present invention rather than limiting the patent scope of the present invention, and any equivalent structural transformation made within the inventive concept of the present invention by utilizing the description and accompanying drawings of the present invention, or any direct or indirect applications in other related technical fields shall all fall within the patent protection scope of the present invention.

What is claimed is:

1. A handwriting input device, comprising a display component, a magnetic signal sensing component arranged at a random position within a range of 100 mm away from the display component in front or rear of the display component, and a magnetic signal output component arranged corresponding to the magnetic signal sensing component, wherein the display component, the magnetic signal sensing component and the magnetic signal output component are all arranged in a shell, and the shell is further provided with a mainboard;

wherein the magnetic signal sensing component comprises a sensing element and a detection control circuit which is connected with the sensing element, the sensing element comprises a horizontal encoding array and a vertical encoding array which is vertical to the horizontal encoding array, and both the horizontal encoding array and the vertical encoding array consist of magnetic signal sensing coil units;

wherein the detection control circuit comprises a multichotomous array switch, a pre-stage signal amplifier, a gain controlled amplifier, a band-pass amplifier, an ac/dc converter, an integrating circuit, a direct current amplifier, a charge and discharge switch, and a processor;

wherein one side of the multichotomous array switch is respectively connected with the horizontal magnetic sensing coil and the vertical magnetic sensing coil, while the other side thereof is connected with the pre-stage signal amplifier, and the pre-stage signal amplifier is connected with the gain controlled amplifier;

one end of the gain controlled amplifier leads to the processor, while the other end leads to the band-pass amplifier and the band-pass amplifier is connected with the integrating circuit via the ac/dc converter; and one end of the integrating circuit leads to the processor via the direct current amplifier, while the other end leads to the charge and discharge switch, and the processor respectively leads to the multichotomous array switch and the charge and discharge switch.

2. The handwriting input device of claim 1, wherein the horizontal encoding array is composed of more than one magnetic signal sensing coil unit; the vertical encoding array is composed of more than one magnetic signal sensing coil unit; the magnetic signal sensing coil unit is formed by at least two magnetic sensing coils which are connected in series via a differential line; and the magnetic sensing coil is constituted by continuous loop wires of 1 circle to 10 circles.

3. The handwriting input device of claim 1, wherein the differential line which connects the magnetic sensing coils in series in the magnetic signal sensing coil unit is positioned within a magnetic sensing positioning valid region.

4. The handwriting input device of claim 1, wherein the differential line which connects the magnetic sensing coils in series in the magnetic signal sensing coil unit is positioned outside a magnetic sensing positioning valid region.

5. The handwriting input device of claim 1, wherein a middleware is further arranged between the display component and the magnetic signal sensing component.

6. The handwriting input device of claim 1, wherein the magnetic signal output component is an electromagnetic stylus, and a head end of the electromagnetic stylus is an alternating electromagnetic signal source.

7. The array encoding magnetic signal positioning sensing device of claim 1, wherein the magnetic signal sensing coils arranged in the horizontal encoding array and the magnetic signal sensing coils arranged in the vertical encoding array are intersected with each other and are arranged in a combination manner.

8. The handwriting input device of claim 1, wherein the combination are set as follows: the combination in pairs between any magnetic signal sensing coil on any magnetic signal sensing coil unit in the horizontal encoding array and the vertical encoding array and the magnetic sensing coil on other adjacent front or rear magnetic signal sensing coil unit are not repeated with the combination in pairs at any other position; and the magnetic sensing coil simultaneously following on the same magnetic signal sensing coil unit does not continuously participate in the combination in pairs at any position.

9. The handwriting input device of claim 2, wherein the combination in pairs of any two magnetic sensing coils with adjacent positions in the horizontal encoding array and the vertical encoding array are unique.

10. The handwriting input device of claim 2, wherein the differential line which connects the magnetic sensing coils in series in the magnetic signal sensing coil unit is positioned within a magnetic sensing positioning valid region.

11. The handwriting input device of claim 2, wherein the differential line which connects the magnetic sensing coils in series in the magnetic signal sensing coil unit is positioned outside a magnetic sensing positioning valid region.

\* \* \* \* \*